(12) United States Patent
Byun

(10) Patent No.: US 11,550,662 B2
(45) Date of Patent: Jan. 10, 2023

(54) STORAGE DEVICE AND COMPUTING SYSTEM

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/348,462

(22) Filed: Jun. 15, 2021

(65) Prior Publication Data

US 2022/0179744 A1 Jun. 9, 2022

(30) Foreign Application Priority Data

Dec. 4, 2020 (KR) ........................ 10-2020-0168774

(51) Int. Cl.
*G06F 11/10* (2006.01)
*G06F 9/4401* (2018.01)
*G06F 12/10* (2016.01)

(52) U.S. Cl.
CPC ........ *G06F 11/1076* (2013.01); *G06F 9/4401* (2013.01); *G06F 12/10* (2013.01); *G06F 2212/1036* (2013.01)

(58) Field of Classification Search
CPC .... G06F 11/1076; G06F 9/4401; G06F 12/10; G06F 2212/1036
See application file for complete search history.

(56) References Cited

U.S. PATENT DOCUMENTS

2020/0210280 A1* 7/2020 Singidi ............... G06F 11/1441

FOREIGN PATENT DOCUMENTS

| KR | 10-2014-0054204 A | | 5/2014 | |
|---|---|---|---|---|
| KR | 10-2019-0136673 A | | 12/2019 | |
| WO | WO-2021154200 A1 | * | 8/2021 | .......... G06F 11/1433 |

* cited by examiner

*Primary Examiner* — Kyle Vallecillo
(74) *Attorney, Agent, or Firm* — IP & T Group LLP

(57) ABSTRACT

The present technology relates to an electronic device. More specifically, the present technology relates to a storage device and a computing system. A storage device according to an embodiment may include a memory device including a firmware block group configured to store main firmware data and sub firmware data, and a user block group configured to store write data, and a memory controller, in response to a booting request provided from a host, configured to count a number of previously generated power losses based on data stored in an open block in the user block group in a booted state based on the main firmware data, performs a rebooting operation using the sub firmware data when the number of power losses exceeds a reference number, and execute sub firmware to correct an error of data related to the power losses.

20 Claims, 19 Drawing Sheets

FIG. 5
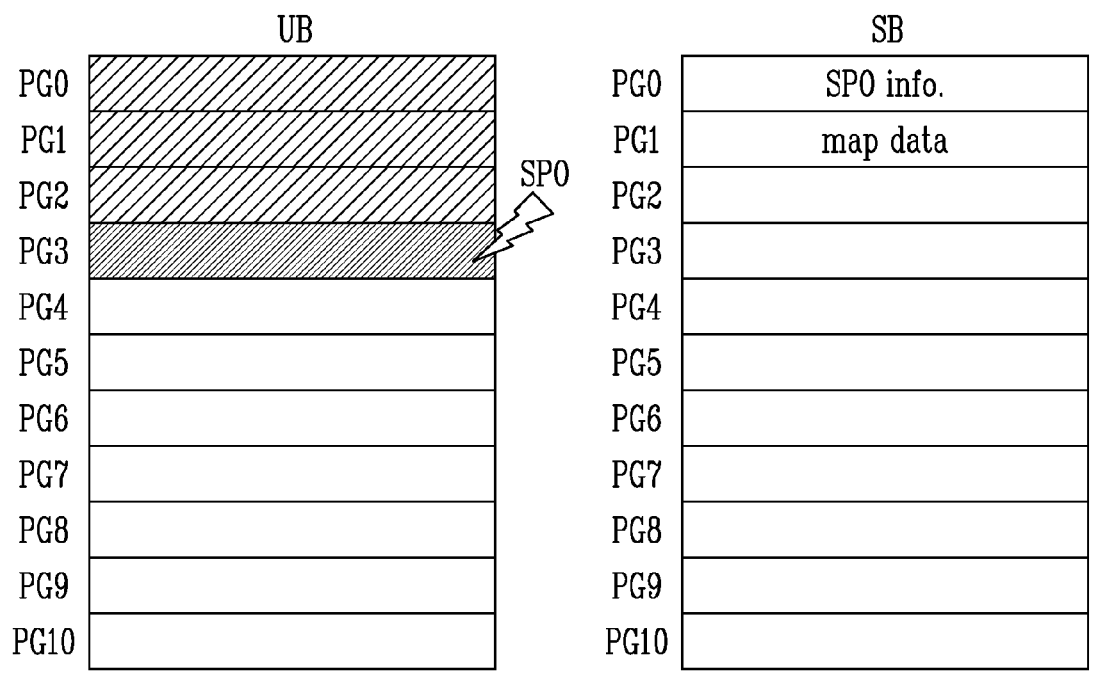
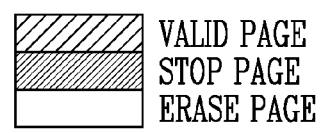

FIG. 6
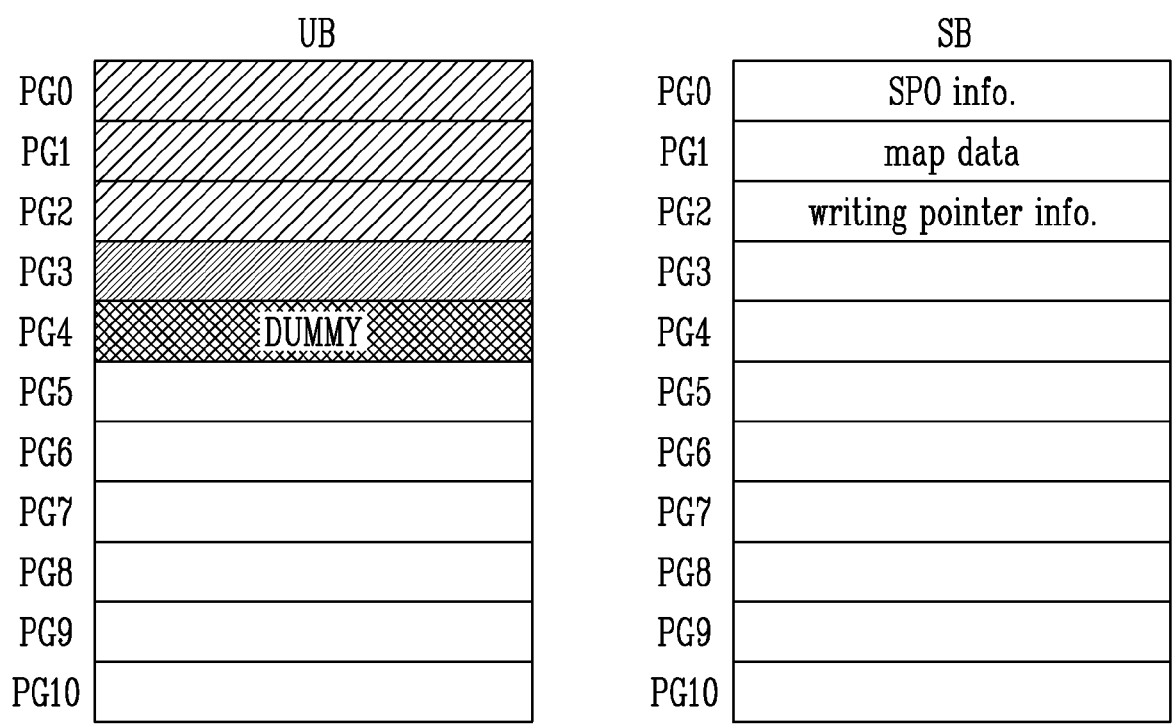
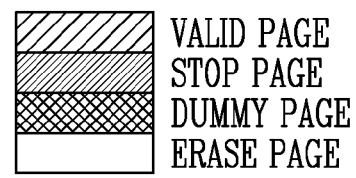

STORAGE DEVICE AND COMPUTING SYSTEM

CROSS-REFERENCE TO RELATED APPLICATION

The present application claims priority under 35 U.S.C. § 119(a) to Korean patent application number 10-2020-0168774, filed on Dec. 4, 2020, with the Korean Intellectual Property Office and is incorporated herein by reference in its entirety.

BACKGROUND

Field of Invention

One or more embodiments described herein relate to a storage device and a computing system.

Description of Related Art

A storage device stores data under control of a host, and may include a memory controller to control a memory device. The memory device may be a volatile memory device or a nonvolatile memory device. A volatile memory device stores data only while receiving power from a power source. When the power supply is cut off, the data is lost. Examples of a volatile memory device include a static random access memory (SRAM) and a dynamic random access memory (DRAM). A nonvolatile memory device stores data even when power is cut off. Examples of a nonvolatile memory device include a read only memory (ROM), a programmable ROM (PROM), an electrically programmable ROM (EPROM), an electrically erasable and programmable ROM (EEPROM), and a flash memory.

SUMMARY

One or more embodiments described herein provide a storage device and a computing system which may achieve improved reliability by executing firmware that corrects data errors, even when a power loss occurs.

A storage device according to an embodiment of the present disclosure may include a memory device including a firmware block group configured to store main firmware data of main firmware for performing an operation according to an operation request provided from a host and sub firmware data of sub firmware for correcting an error of data related to power losses, and a user block group configured to store write data, and a memory controller, in response to a booting request provided from a host, configured to count a number of previously generated power losses based on data stored in an open block in the user block group in a booted state based on the main firmware data, perform a rebooting operation using the sub firmware data when the number of power losses exceeds a reference number, and execute sub firmware to correct an error of data related to the power losses.

A storage device according to another embodiment of the present disclosure may include a memory device including a firmware block group configured to store main firmware data of main firmware for performing an operation according to an operation request provided from a host, and sub firmware data of sub firmware for correcting an error of data related to a power loss, a buffer memory configured to temporarily store data, and a memory controller configured to control the memory device to load the sub firmware data to the buffer memory in response to a sub firmware execution request provided from the host, and execute the sub firmware according to the loaded sub firmware data.

A computing system according to still another embodiment of the present disclosure may include a host device configured to output a booting request, determine whether a booting completion response to the booting request is received during a preset event period after the booting request is output, and output a sub firmware execution request according to a reception result of the booting completion response, and a storage device configured to execute sub firmware for correcting an error of data related to power loss, in response to the sub firmware execution request.

An apparatus according to still another embodiment of the present disclosure may include at least one storage area configured to store first instructions and second instructions, and a controller configured to execute the first instructions when a number of power losses occurring over a period is less than a predetermined number and to execute the second instructions when the number of power losses is greater than or equal to the predetermined number, wherein the first instructions correspond to a booting operation, and the second instructions, when executed by the controller, cause the controller to correct an error in meta data due to at least one of the power losses, the meta data corresponding to stored data.

A method of operating a storage device including a memory device and a memory controller, the method according to still another embodiment of the present disclosure may include receiving a booting request from a host, performing a recovery operation corresponding to a power loss while a main firmware mode is performed, changing a firmware mode from the main firmware mode to a sub firmware mode for correcting an error of data related to previous generated power losses when a number of the power losses is greater than a reference count and performing a rebooting operation in the sub firmware mode.

According to the present technology, a storage device and a computing system having high reliability by executing firmware that corrects a data error even though a power loss occurs are provided.

BRIEF DESCRIPTION OF THE DRAWINGS

FIG. 5 illustrates an example relating to power loss.
FIG. 6 illustrates an embodiment of a recovery operation for a power loss.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and are not limited to the embodiments described in the present specification or application.

Figure 1:
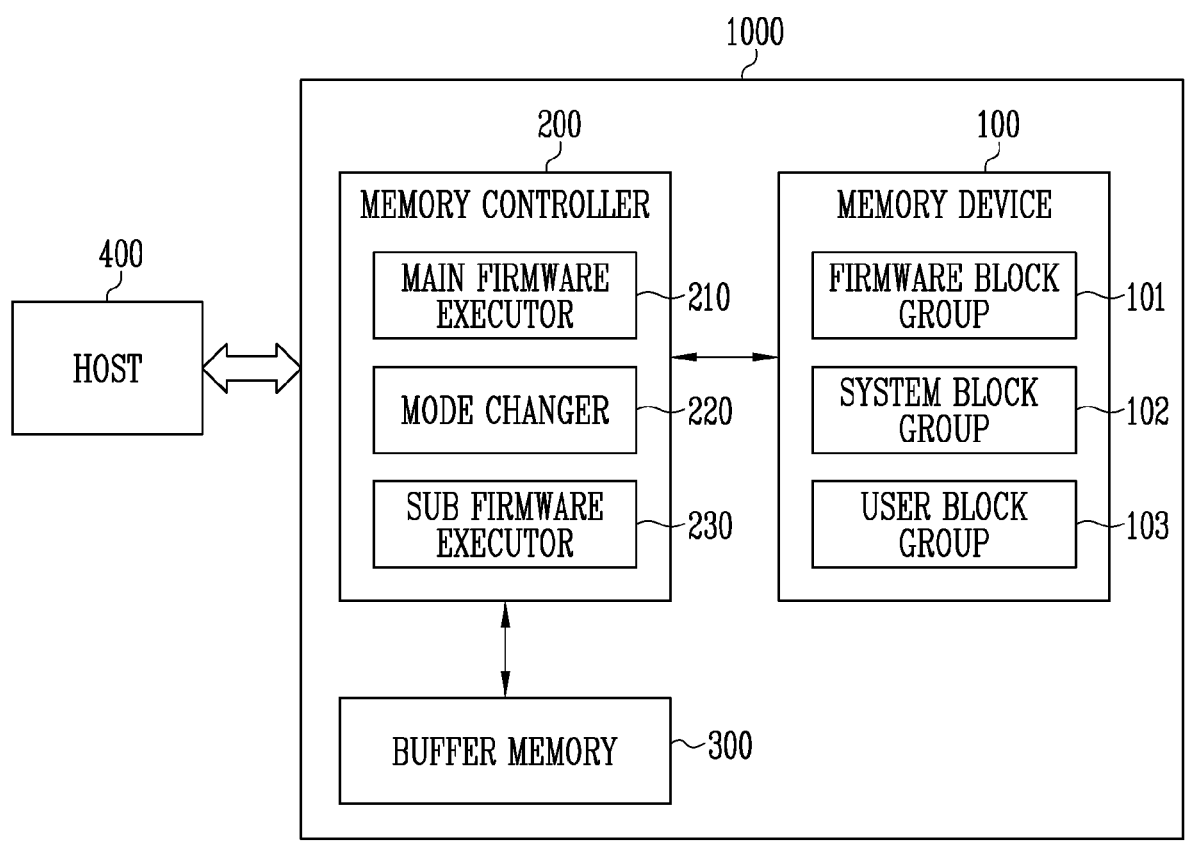
FIG. 1 illustrates an embodiment of a storage system.

FIG. 1 is a diagram illustrating an embodiment of a storage system which may be implemented, for example, as or in a personal computer (PC), a data center, a corporate data storage system, a data processing system including a direct attached storage (DAS), a data processing system including a storage area network (SAN), or a data processing system including a network attached storage (NAS). In one embodiment, a storage system and computing system may have the same meaning.

The storage system may include a storage device 1000 and a host 400. The storage device 1000 may be a device that stores data according to a request of the host 400. Examples of the host 400 include a cellular phone, a smartphone, an MP3 player, a laptop computer, a desktop computer, a game player, a TV, a tablet PC, or an in-vehicle infotainment system.

The storage device 1000 may be one of various types of storage devices according, for example, to a host interface that implements a communication method with the host 400. Examples of the storage device 1000 include an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 1000 may be implemented in any one of various types of packages. Examples include a package on package (POP), a system in package (SIP), a system on chip (SOC), a multi-chip package (MCP), a chip on board (COB), a wafer-level fabricated package (WFP), and a wafer-level stack package (WSP).

The storage device 1000 may include a memory device 100, a memory controller 200, and a buffer memory 300. The memory device 100 may operate in response to control of the memory controller 200. For example, the memory device 100 may receive commands and addresses from the memory controller 200 and may access memory cells selected by the addresses. The memory device 100 may perform operations based on the commands selected by the addresses.

The commands may include, for example, a program command, a read command, or an erase command and the operations to be performed based on the commands may be, for example, a program operation (or a write operation), a read operation, or an erase operation, respectively.

The program operation may be an operation in which the memory device 100 stores data from the host 400 in response to control of the memory controller 200. For example, the memory device 100 may receive a program command, an address and data and may program the data in a memory cell selected by the address. Data to be programmed in the selected memory cell may be referred to as write data. The write data may include user data from the host 400 and meta data corresponding to the user data.

The read operation may be an operation in which the memory device 100 reads data stored in the memory device 100 in response to the control of the memory controller 200. For example, the memory device 100 may receive the read command and an address, and read data from a region selected by the address in the memory cell array. Data to be read from the selected region among data stored in the memory device 100 may be referred to as read data.

The erase operation may be an operation in which the memory device 100 erases the data stored in the memory device in response to the control of the memory controller 200. For example, the memory device 100 may receive the erase command and an address, and erase data stored in a region selected by the address.

In one embodiment, the memory device 100 may be implemented with a nonvolatile memory device. Examples of the nonvolatile memory device include a resistive random access memory (RRAM), a phase-change random access memory (PRAM), a magnetoresistive random access memory (MRAM), a ferroelectric random access memory, a spin transfer torque random access memory, a flash memory, and the like. For example, the flash memory may include a NAND flash memory, a vertical NAND flash memory (vertical NAND), and a NOR flash memory. For convenience of description, it is assumed that the memory device 100 is a NAND flash memory.

The memory device 100 may store the write data, or read the stored data and provide the read data, to the memory controller 200 under the control of memory controller 200.

The memory device 100 may include one plane, which, for example, may include a memory cell array including memory cells storing data. The memory cell array may include a plurality of memory blocks, each of which may be a unit that performs an erase operation of erasing data.

The plurality of memory blocks in the memory device 100 may be divided into a firmware block group 101, a system block group 102, and a user block group 103. The firmware block group 101 may include at least one firmware block that stores firmware data. The firmware data may include, for example, main firmware data, sub firmware data, and verify firmware data.

The system block group 102 may include at least one system block that stores the meta data.

The user block group 103 may include at least one user block that stores write data. The user block in the user block group 103 may be, for example, an open block, a close block or a free block. The open block may be a user block that stores data from the host 400. The close block may be a user block in which all data is written or one in which data may not be written any more. The free block may be a user block in which data is not yet written.

The meta data may include information on data stored in the plurality of memory blocks. For example, the meta data may include map data, validity data, write pointer data (or writing pointer information), and/or additional data. The map data may indicate a mapping relationship between a logical address and a physical address. In one embodiment, the map data may indicate a physical address of the memory block. For example, the validity data may indicate validity of the data (or the user data) provided from the host 400. The write pointer data may indicate, for example, a physical address in which data is to be stored, or may indicate another type of address or pointer.

The memory block may include a plurality of pages. In one embodiment, a page may be a unit that performs a program operation of storing write data or read operation of reading the stored read data.

The memory cell may be a single level cell (SLC) that stores one bit of data, a multi-level cell (MLC) that stores two bits of data, a triple-level cell (TLC) that stores three bits of data, a quadruple level cell (QLC) that stores four bits of data, or a memory cell that stores five or more bits of data.

The memory controller 200 may perform a booting operation in response to a booting request from the host 400. The memory controller 200 may check whether booting operation is normally completed. For example, the memory controller 200 may check whether booting is normally completed by loading and then executing verify firmware data stored in the memory device 100. When the booting operation is normally completed, the memory controller 200 may provide a booting completion response indicating that booting operation is complete to the host 400.

The memory controller 200 may control overall operation of the storage device 1000. When power is applied to the storage device 1000, the memory controller 200 may execute firmware (and/or other types of instructions).

When the memory device 100 is a flash memory device, the firmware may include a host interface layer, a flash translation layer, and a flash interface layer. The applied power may be, for example, power supplied from an external source. The host interface layer may control operations between the host 400 and the memory controller 200. The flash translation layer may convert logical addresses from the host 400 to corresponding physical addresses. The flash interface layer may control communications between the memory controller 200 and the memory device 100.

The memory controller 200 may control the memory device 100 to perform the program operation, the read operation, and the erase operation in response to a write request, a read request, and an erase request of the host 400, respectively. During the program operation, the memory controller 200 may provide the program command, the physical addresses, and the write data to the memory device 100. During the read operation, the memory controller 200 may provide the read command and the physical address to the memory device 100. During the erase operation, the memory controller 200 may provide the erase command and the physical address to the memory device 100.

In one embodiment, the memory controller 200 may generate commands, addresses, and data autonomously regardless of a request from the host 400. The memory controller 200 may transmit the autonomously generated commands, addresses, and data to the memory device 100. For example, the memory controller 200 may generate a command, an addresses, and data for performing a background operation. In addition, the memory controller 200 may provide commands, addresses, and data to the memory device 100.

A background operation may be at least one of wear leveling, read reclaim, or garbage collection. Wear leveling may include, for example, static wear leveling, dynamic wear leveling, and/or other operations. Static wear leveling may include an operation of storing the number of times memory blocks are erased and moving cold data in which an erase operation or a write operation hardly occurs to a memory block having the largest number of erase times. Dynamic wear leveling may include an operation of storing the number of times memory blocks are erased and programming data in a memory block having the least number of erase times.

Read reclaim may include an operation of moving data stored in a memory block to another memory block before an uncorrectable error occurs in data stored in a memory block.

Garbage collection may include an operation of copying valid data in a bad block to a free block and erasing invalid data in the bad block. Copying the valid data in the bad block to the free block may include, for example, an operation of moving valid data in the bad block to the free block.

In one embodiment, the memory controller 200 may control two or more memory devices 100. In this case, the memory controller 200 may control the memory devices 100 according to an interleaving method to improve operation performance. The interleaving method may be a method of controlling operations of two or more memory devices 100 to overlap.

In some cases, power loss may occur while the memory controller 200 performs the booting operation or controls overall operation of the storage device 1000. The power loss may correspond, for example, to a situation in which supply of power to the storage device 1000 is stopped or otherwise interrupted. For example, a power loss may include a sudden power off (SPO).

When a power loss occurs while the memory device 100 performs the program operation, invalid data may be stored in the memory block, and data to be stored may not be completely stored in the memory block.

After the power loss occurs and then power is restored to the storage device 1000 and a booting request is received from the host 400, the memory controller 200 may perform the booting operation using the main firmware. The memory controller 200 may perform a recovery operation for the power loss occurring in a booted state. An example is described with reference to FIGS. 5 and 6.

The main firmware may include firmware that performs one or more operations based on an operation request from the host 400. The operation request may be, for example, a write request, a read request, or an erase request. The sub firmware may correct error data generated in the power loss. The main firmware may correspond, for example, to a host interface layer, a flash translation layer, and/or a flash interface layer.

When a power loss repeatedly occurs, an error may occur in the meta data stored in the memory device 100. In some cases, the main firmware (e.g., host interface layer, flash translation layer, and flash interface layer) may not correct the error due to repetition of the power loss. Therefore, instead of the main firmware, the sub firmware (e.g., firmware capable of correcting the error in the meta data) may be executed. In one embodiment, the sub firmware may be selectively executed according to the number of times a power loss is repeated.

In an embodiment, in the booted state based on the main firmware, memory controller 200 may count the number of times a power loss occurs based on data stored in the open block. The memory controller 200 may execute the main firmware or may perform a rebooting operation using the sub firmware based on comparing the power loss number and a preset reference number.

For example, when the number of power losses is less than or equal to the reference number, the memory controller 200 may execute the main firmware. When the number of power loss exceeds the reference number, the memory controller 200 may perform a rebooting operation using the sub firmware. In one embodiment, the memory controller 200 may execute the sub firmware.

In an embodiment, the memory controller 200 may include a main firmware executor 210, a mode changer 220, and a sub firmware executor 230. The main firmware executor 210 may perform the booting operation using the main firmware in response to the booting request from the host 400. The main firmware executor 210 may check whether booting operation is normally completed by executing the verify firmware.

The main firmware executor 210 may perform a power loss recovery operation in the booting state. For example, the main firmware executor 210 may control the memory device 100 to store dummy data in an erase page in the open block. An embodiment of this is described with reference to FIGS. 5 and 6.

The main firmware executor 210 may control the memory device 100 to read the main firmware data in response to determination of a main firmware mode by the mode changer 220. In addition, the main firmware executor 210 may perform the rebooting operation in the main firmware mode. When the rebooting operation is completed, the main firmware executor 210 may provide the booting completion response to the host 400.

In an embodiment, the mode changer 220 may determine the main firmware mode or a sub firmware mode based on the number of power losses. For example, the mode changer 220 may calculate the number of power losses based on the dummy data in the open block. In addition, the mode changer 220 may determine the sub firmware mode according to whether the number of power losses is greater than the reference number.

When the number of power losses is greater than the reference number, the mode changer 220 may enter the sub firmware mode. In the sub firmware mode, the sub firmware may be executed and sub firmware data may be loaded to the buffer memory 300. The mode changer 220 may change a firmware mode from the sub firmware mode to the main firmware mode after execution of the sub firmware is completed. In the main firmware mode, the main firmware may be executed and main firmware data may be loaded to the buffer memory 300.

In an embodiment, the sub firmware executor 230 may control the memory device 100 to read the sub firmware data in response to determination of the sub firmware mode by the mode changer 220. The sub firmware executor 230 may execute the sub firmware according to the read sub firmware data. In an embodiment, the sub firmware executor 230 may execute the sub firmware in response to a signal requesting to execute the sub firmware from the host 400. Accordingly, even when a power loss occurs, reliability of data may be maintained by executing firmware that corrects the error of data.

In one embodiment, the buffer memory 300 may store data only while receiving power from a power source. In this case, buffer memory 300 may be a volatile memory device. Examples of the volatile memory device include a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), and the like.

In an embodiment, the buffer memory 300 may temporarily store the data from the host 400 and/or may temporarily store data from the memory device 100.

In an embodiment, in the sub firmware mode, the buffer memory 300 may temporarily store the sub firmware data stored in the memory device 100.

In an embodiment, in the sub firmware mode, the buffer memory 300 may temporarily store the meta data included in the memory device 100.

In an embodiment, in the main firmware mode, the buffer memory 300 may temporarily store the main firmware data stored in the memory device 100.

An auxiliary power supply device for generating auxiliary power in response to the occurrence of power loss may be further included.

The host 400 may communicate with the storage device 1000 through an interface, to store data in the storage device 1000 or obtain data stored in the storage device 1000. Examples of the interface include a serial advanced technology attachment (SATA) interface, a SATA express (SATAe) interface, a serial attached small computer system (SAS) interface, a peripheral component interconnect express (PCIe) interface, a nonvolatile memory express (NVMe) interface, an advanced host controller interface (AHCI), a multimedia card interface, or another type of interface.

The host 400 may provide the booting request to the storage device 1000. In addition, host 400 may receive a booting completion response during a preset event period. The event period may include a period that becomes a reference for determining whether host 400 controls an abnormally operating storage device 1000. In one embodiment, controlling the storage device 1000 may include controlling the above-described storage device 1000 to execute the sub firmware.

When the booting completion response is provided to the host 400 within the event period, the host 400 may provide an operation request to the storage device 1000. The operation request may be, for example, a write request, a read request, or an erase request.

In an embodiment, the host 400 may provide the storage device 1000 with a write request that requests to store data in the storage device 1000. In addition, the host 400 may provide a write request, data, and a logical address for identifying the data to the storage device 1000. The storage device 1000 may store write data including the metadata and the data from the host 400 in the memory device 100 in response to the write request by the host 400, and may provide to the host 400 a response indicating that storage is complete.

In an embodiment, the host 400 may provide the storage device 1000 with a read request requesting to provide the host 400 with the data stored in the storage device 1000. In addition, the host 400 may provide the read request and a read address to the storage device 1000.

The storage device 1000 may read, from the memory device 100, the read data corresponding to the read address provided by the host 400. This operation may be performed in response to the read request from the host 400. The storage device 1000 may provide the read data to the host 400 in response to the read request.

The storage device 1000 may not provide a response to a booting request to the host 400. The case where storage device 1000 does not provide a response to the host 400 may correspond to a stuck condition of the storage device 1000.

When the booting completion response is not provided to the host 400 within the preset response waiting period (e.g., when a stuck condition exists in the storage device 1000), the host 400 may provide a reset request to request reset of the storage device 1000. In one embodiment, the response waiting period may be a period in the event period.

When a booting completion response is not continuously received during the event period, the host 400 may provide a sub firmware execution request to the storage device 1000. In an embodiment, the host 400 may provide the sub firmware execution request to the storage device 1000 according, for example, to a stuck count indicating the number of times that the stuck occurs in the storage device 1000 or the number of times the storage device 1000 does not respond. In an embodiment, the host 400 may provide the sub firmware request to the storage device 1000 according to a stuck period, e.g., a period in which the storage device 1000 does not respond.

The storage device 1000 may determine the firmware mode as the sub firmware mode in response to the sub firmware execution request. In addition, the storage device 1000 may execute the sub firmware in the sub firmware mode. In addition, when execution of the sub firmware is completed, the storage device 1000 may change the firmware mode from the sub firmware mode to the main firmware mode, and may obtain the main firmware data in the main firmware mode. In addition, the storage device 1000 may perform the booting operation and may provide the booting completion response to the host 400.

Figure 2:
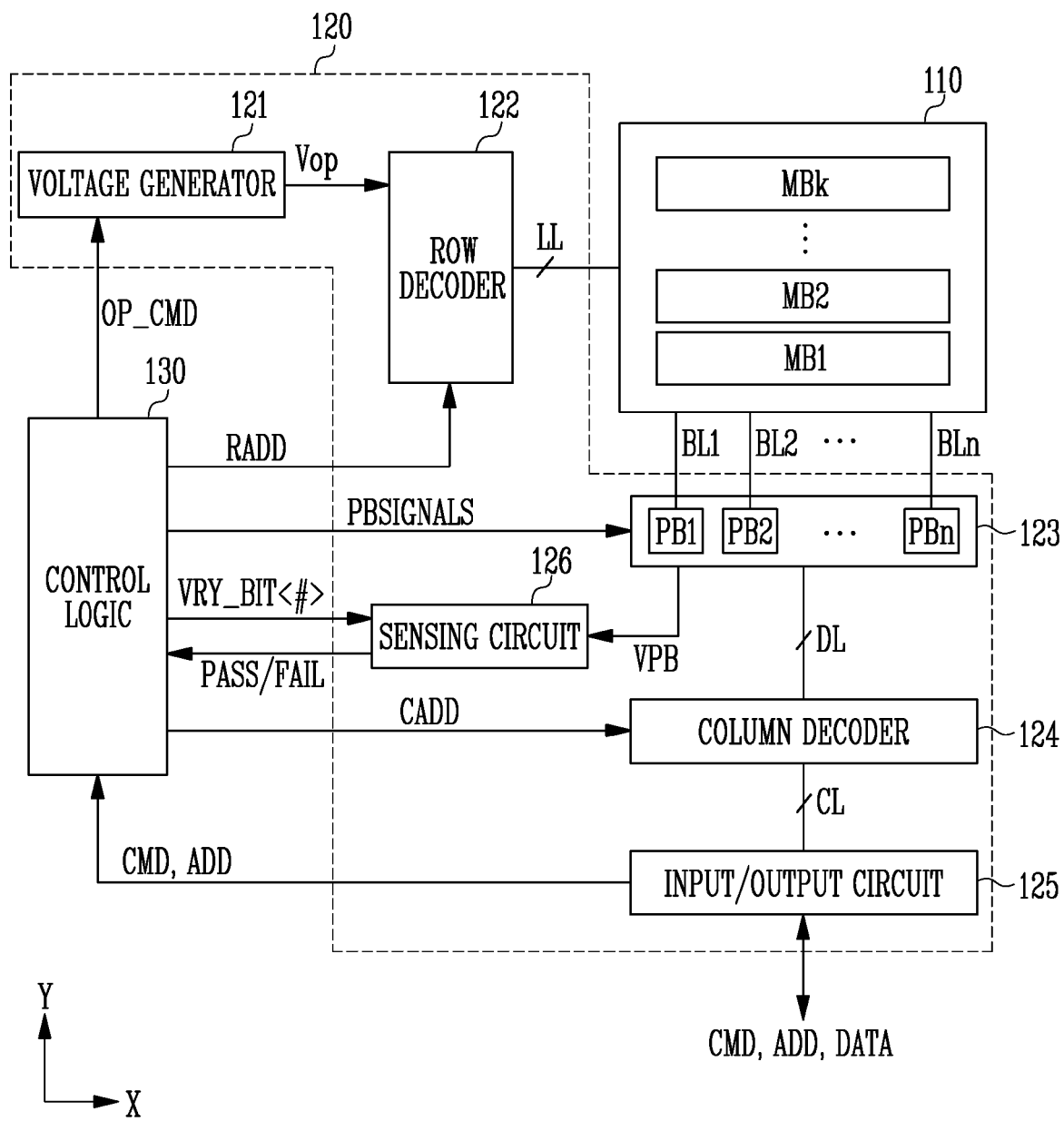
FIG. 2 illustrates an embodiment of a memory device.

FIG. 2 is a diagram illustrating an embodiment of a memory device 100, which may include a memory cell array 110, a peripheral circuit 120, and a control logic 130.

The memory cell array 110 may include a plurality of memory blocks MB1 to MBk, where k is a positive integer. The number of memory blocks MB1 to MBk is only an example and may be a different number in another embodiment.

Each of the memory blocks MB1 to MBk may be connected to local lines LL and bit lines BL1 to BLn, where n is a positive integer. The local lines LL may be connected between a row decoder 122 and the memory blocks MB1 to MBk. The local lines LL may include a first select line, a second select line, and a plurality of word lines arranged between the first select line and the second select lines. In one embodiment, the local lines LL may further include dummy lines arranged between the first select line and the word lines, dummy lines arranged between the second select line and the word lines, and/or pipelines.

The bit lines BL1 to BLn may be commonly connected to the memory blocks MB1 to MBk and may be implemented as a two-dimensional or three-dimensional structure. For example, when implemented in a two-dimensional structure, memory cells may be arranged in a direction parallel to a substrate. When implemented in a three-dimensional structure, memory cells may be stacked in a direction vertical to a substrate.

The peripheral circuit 120 may include a voltage generator 121, the row decoder 122, a page buffer group 123, a column decoder 124, an input/output circuit 125, and a sensing circuit 126. The voltage generator 121 may generate various operation voltages Vop used for a program operation, a read operation, and an erase operation in response to corresponding operation commands OP_CMD. In addition, the voltage generator 121 may selectively discharge the local lines LL in response to an operation command OP_CMD. For example, the voltage generator 121 may generate a program voltage, a verify voltage, pass voltages, a turn-on voltage, a read voltage, an erase voltage, a source line voltage, and/or one or more other voltages under control of the control logic 130.

As an embodiment, the voltage generator 121 may generate an internal power voltage by regulating an external power voltage. The internal power voltage may be used as an operation voltage of the memory device 100.

As an embodiment, the voltage generator 121 may generate a plurality of voltages using an external power voltage or an internal power voltage. For example, the voltage generator 121 may include a plurality of pumping capacitors that receive the internal power voltage and generate a plurality of voltages by selectively activating the pumping capacitors in response to control of the control logic 130. The generated voltages may be supplied to the memory cell array 110 by the row decoder 122.

The row decoder 122 may transfer the operation voltages Vop to the local lines LL in response to a row address RADD. The operation voltages Vop may be transferred to selected memory blocks MB1 to MBk through the local lines LL.

For example, during a program operation, the row decoder 122 may apply a program voltage to a selected word line and a program pass voltage (of a level different from (e.g., less than) that of the program voltage) to unselected word lines. During a program verify operation, the row decoder 122 may apply a verify voltage to the selected word line and a verify pass voltage (different from (e.g., higher than) the verify voltage) to the unselected word lines. During a read operation, the row decoder 122 may apply a read voltage to the selected word line and a read pass voltage (different from (e.g., higher than) the read voltage) to the unselected word lines. During an erase operation, the row decoder 122 may select one memory block according to a decoded address. Also, during the erase operation, the row decoder 122 may apply a reference (e.g., ground) voltage to word lines connected to the selected memory block.

The page buffer group 123 may include first to n-th page buffers PB1 to PBn. The first to n-th page buffers PB1 to PBn may be connected to the memory cell array 110 through the first to n-th bit lines BL1 to BLn, respectively. The first to n-th page buffers PB1 to PBn may operate in response to the control of the control logic 130.

In one embodiment, the first to n-th page buffers PB1 to PBn may operate in response to page buffer control signals PBSIGNALS. For example, the first to n-th page buffers PB1 to PBn may temporarily store data received through the first to n-th bit lines BL1 to BLn or may sense a voltage or a current of the bit lines BL1 to BLn during the read operation or the verify operation.

During a program operation, when the program voltage is applied to the selected word line, the first to n-th page buffers PB1 to PBn may transfer data DATA received through the column decoder 124 and the input/output circuit 125 and to the selected memory cells through the first to n-th bit lines BL1 to BLn. The memory cells of the selected page are programmed according to the transferred data DATA. The memory cell connected to the bit line to which a program permission voltage (for example, a ground voltage) is applied may have an increased threshold voltage. The threshold voltage of the memory cell connected to the bit line to which a program inhibit voltage (for example, a power voltage) is applied may be maintained.

During a verify operation, the first to n-th page buffers PB1 to PBn may sense the data stored in the memory cells selected through the first to n-th bit lines BL1 to BLn.

During a read operation, the first to n-th page buffers PB1 to PBn may sense the data DATA from the memory cells of the selected page through the first to n-th bit lines BL1 to BLn, and output the sensed data DATA to the input/output circuit 125 under control of the column decoder 124.

During an erase operation, the first to n-th page buffers PB1 to PBn may float the first to n-th bit lines BL1 to BLn.

The column decoder 124 may transfer data between the input/output circuit 125 and the page buffer group 123 in response to a column address CADD. For example, the column decoder 124 may exchange data with the page buffers PB1 to PBn through data lines DL or may exchange data with the input/output circuit 125 through column lines CL. The input/output circuit 125 may transfer the command CMD and the address ADD from the memory controller 200 to the control logic 130 or may exchange data DATA with the column decoder 124.

During a read operation or verify operation, the sensing circuit 126 may generate a reference current in response to a permission bit signal VRY_BIT<#> and may compare a sensing voltage VPB from the page buffer group 123 with a reference voltage generated by the reference current to output a pass signal PASS or a fail signal FAIL.

The control logic 130 may output the operation command OP_CMD, row address RADD, page buffer control signals PBSIGNALS, and the permission bit VRY_BIT<#> in response to the command CMD and the address ADD to control the peripheral circuit 120.

Figure 3:
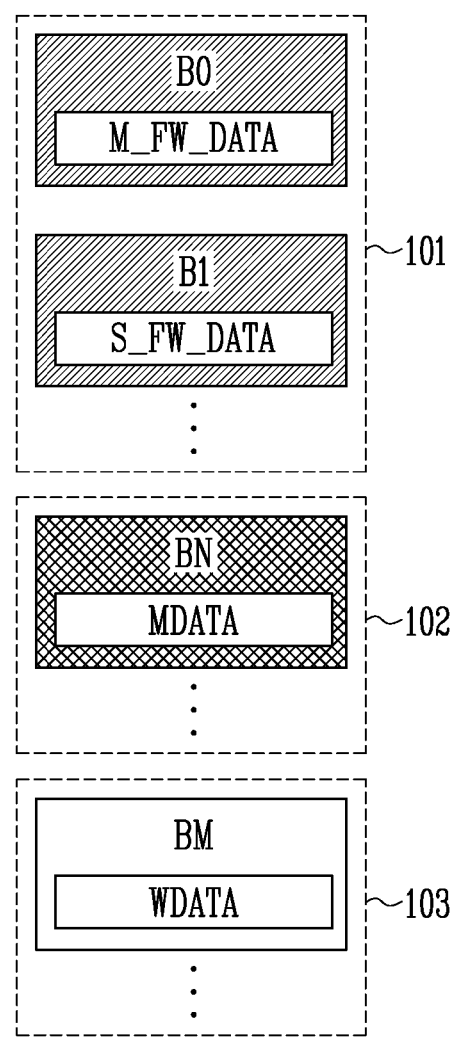
FIG. 3 illustrates an embodiment of a firmware block group, a system block group, and a user block group.

FIG. 3 is a diagram illustrating examples of a firmware block group, a system block group, and a user block group.

Referring to FIG. 3, the memory device 100 may include the firmware block group 101, the system block group 102, and the user block group 103. For example, a plurality of memory blocks B0, B1, BN, and BM in the memory device 100 may be divided into the firmware block group 101, the system block group 102, and the user block group 103, where N is a natural number equal to or greater than 2 and M may be a natural number greater than N.

The firmware block group 101 may be a group including at least one firmware block among memory blocks B0, B1, BN, and BM. The firmware block may be a memory block that stores firmware data. The firmware data may include a program code or a firmware image to execute the firmware.

Referring to FIG. 3, for example, the firmware block group 101 may include the 0-th memory block B0 and the first memory block B1. Main firmware data M_FW_DATA may be stored in the 0-th memory block B0. For example, the main firmware data M_FW_DATA may be firmware data for executing the flash translation layer described above with reference to FIG. 1. Sub firmware data S_FW_DATA may be stored in the first memory block B1. The verify firmware data may be stored in one of the memory blocks in the firmware block group 101.

The system block group 102 may be a group including at least one system block among the memory blocks B0, B1, BN, and BM. The system block may be a memory block that stores the meta data.

Referring to FIG. 3, the system block group 102 may include, for example, the N-th memory block BN. The meta data MDATA may be stored in the N-th memory block BN. The meta data MDATA may include map data indicating a mapping relationship between logical addresses and physical addresses, writing pointer information indicating a physical address of the page in which the write data is to be stored among the pages in the open block, or map data indicating a physical address of an erase page in the open block.

In one embodiment, a system block in the system block group 102 may be allocated as a firmware block. For example, some of the system blocks in the system block group 102 may be allocated as the firmware blocks, and the system block allocated as the firmware block may be in the firmware block group 101.

In one embodiment, the firmware data may be stored in the system block in the system block group 102. For example, the main firmware data M_FW_DATA may be stored in the system block in the system block group 102. For example, the sub firmware data S_FW_DATA may be stored in the system block in the system block group 102.

The open block may be a memory block in the user block group 103. The user block group 103 may include at least one user block among the plurality of memory blocks B0, B1, BN, and BM. For example, the user block may be a memory block that stores the write data. For example, in FIG. 3, the user block group 103 may include the M-th memory block BM. The write data WDATA may be stored in the M-th memory block BM.

Figure 4:
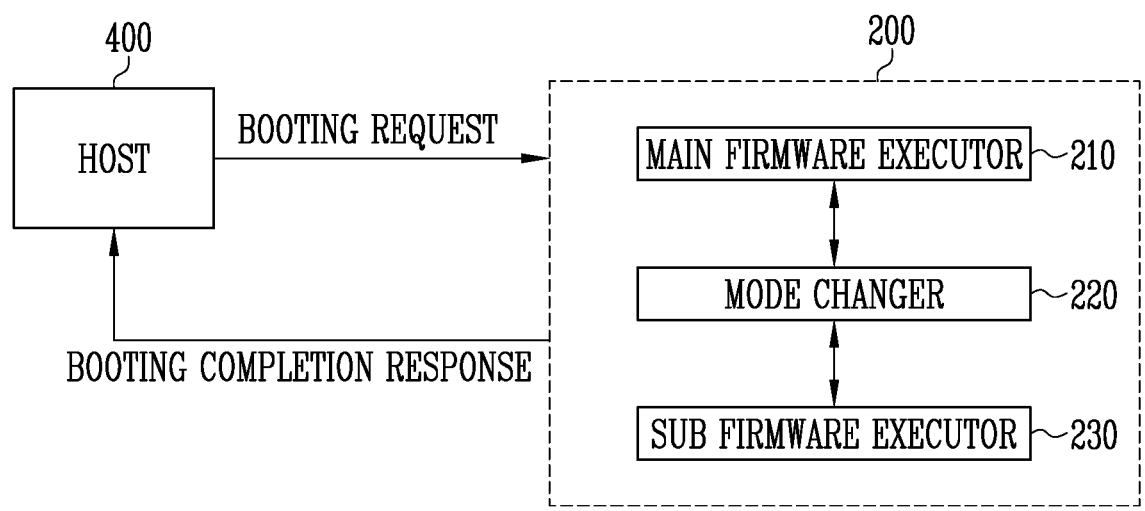
FIG. 4 illustrates an embodiment that outputs a booting completion response to a booting request.

FIG. 4 is a diagram illustrating an embodiment for outputting a booting completion response to a booting request.

Referring to FIGS. 3 and 4, the host 400 may provide the booting request to the memory controller 200, e.g., host 400 may provide the booting request to the main firmware executor 210. The main firmware executor 210 may perform the booting operation using the main firmware data M_FW_DATA in response to the booting request. In FIGS. 3 and 4, for example, the main firmware executor 210 may control the memory device 100 to read the main firmware data M_FW_DATA stored in the 0-th memory block B0. When the main firmware data M_FW_DATA is read, the main firmware executor 210 may perform the booting operation.

The main firmware executor 210 may check whether the booting operation is normally completed by executing the verify firmware. For example, the main firmware executor 210 may control the memory device 100 to read the verify firmware data stored in one of the memory blocks in the firmware block group 101. When the verify firmware data is read, the main firmware executor 210 may execute the verify firmware based on the verify firmware data. The main firmware executor 210 may check whether booting operation is normally completed by executing the verify firmware.

The main firmware executor 210 may sense whether a power loss has occurred. When a power loss has occurred, the main firmware executor 210 may perform a recovery operation for the power loss. The main firmware executor 210 may provide a signal indicating that the recovery operation is completed to the mode changer 220.

The main firmware executor 210 may perform the rebooting operation using the main firmware data M_FW_DATA in response to a signal provided by the mode changer 220. In FIGS. 3 and 4, for example, the main firmware executor 210 may control the memory device 100 to read the main firmware data M_FW_DATA stored in the 0-th memory block B0. When the main firmware data M_FW_DATA is read, the main firmware executor 210 may perform a rebooting operation. After the rebooting operation is completed, the main firmware executor 210 may execute the main firmware and provide the booting completion response to the host 400.

In one embodiment, during the rebooting operation, the main firmware executor 210 may execute the verify firmware data to check whether the rebooting is normally completed.

The mode changer 220 may calculate the number of power losses in response to completion of the recovery operation. The number of power losses may be measured, for example, based on the size of a dummy page or dummy data in the open block. The mode changer 220 may select the main firmware mode or the sub firmware mode according to a result of comparing the power loss number and the reference number. When the number of power losses is less than or equal to the reference number, the mode changer 220 may determine the firmware mode as the main firmware mode. The mode changer 220 may provide a signal indicating the main firmware mode to the main firmware executor 210. When the number of power losses is greater than the reference number, mode changer 220 may determine the firmware mode as the sub firmware mode. The mode changer 220 may provide a signal indicating the sub firmware mode to the sub firmware executor 230.

The sub firmware executor 230 may control the memory device 100 to obtain the sub firmware data S_FW_DATA in response to the signal from the mode changer 220. In FIGS. 3 and 4, the sub firmware executor 230 may control the memory device 100 to, for example, read the sub firmware data S_FW_DATA stored in the first memory block B1. The sub firmware executor 230 may execute the sub firmware according to the read sub firmware data S_FW_DATA. When the sub firmware is executed, the sub firmware executor 230 may correct the error of the data related to the power loss.

For example, when the mapping relationship between a logical address and a physical address in the map data is abnormal, the sub firmware executor 230 may correct the abnormal mapping relationship. For example, when a write pointer indicating a page on which the write operation is to be performed in the open block is abnormal, the sub firmware executor 230 may correct the write pointer that is abnormally indicated.

When the sub firmware is normally ended, the sub firmware executor 230 may provide a signal indicating that the sub firmware is ended to the mode changer 220. In response, the mode changer 220 may change the firmware mode from the sub firmware mode to the main firmware mode and provide a signal indicating that the firmware mode is the main firmware mode to the main firmware executor 210.

When the firmware mode is changed from the sub firmware mode to the main firmware mode, the main firmware executor 210 may control the memory device 100 to read the main firmware data M_FW_DATA. When the main firmware data M_FW_DATA is loaded to the buffer memory 300, the main firmware executor 210 may perform a booting operation. When the booting operation is completed, the main firmware executor 210 may provide the booting completion response to the host 400.

FIG. 5 is a diagram illustrating an example scenario of managing information correspond to a power loss, and FIG. 6 is a diagram illustrating an embodiment of a recovery operation performed for the power loss.

Referring to FIGS. 1 and 5, the memory device 100 may include a user block UB and a system block SB. Each of the user block UB and the system block SB may include a plurality of pages PG0 to PG10. Each page may have a page number. The write data may include the user data and the meta data, which may be stored in one or more of the pages PG0 to PG10 in the user block UB. Meta data for the recovery operation may be stored in one or more of the pages PG0 to PG10 in the system block SB. The number of pages PG0 to PG10 may be different from that shown in FIG. 5 in another embodiment.

The memory controller 200 may control the memory device 100 to store the write data in the user block UB that corresponds to the open block in memory device 100, in response to the write request from host 400. While the write data is sequentially stored in the 0-th page PG0 to the third page PG3 of the user block UB, an unexpected power loss SPO may occur.

When the power loss SPO occurs, the write operation (or the program operation) may be stopped. In this case, valid data may be stored from the 0-th page PG0 to the second page PG2 in the user block UB. Each of the 0-th page PG0 to the second page PG2 (in which the valid data is stored) may be referred to as a valid page. Invalid data or data (in which an error exists) may be stored in a specific page, for example, the third page PG3. The page on which the write operation is stopped due to the power loss may be referred to as a stop page. Incomplete data may be stored in the stop page.

The memory controller 200 may control the memory device 100 to store power loss information (SPO info.) to the system block SB. The power loss information SPO info. may include information indicating that the power loss SPO has occurred. In addition, the memory controller 200 may control the memory device 100 to store the map data map data in the system block SB.

In an embodiment, the map data may include mapping information between the logical address and the physical address of the data stored in the user block UB, e.g., the open block. In FIG. 5, for example, the map data map data may indicate logical addresses of data stored in the 0-th page PG0 to the third page PG3 of the user block UB and physical addresses of the 0-th page PG0 to the third page PG3.

In an embodiment, the map data may include data indicating the physical address of the erase page in the open block. In FIG. 5, the map data may indicate, for example, a physical address of the fourth page PG4 to the tenth page PG10 of the user block UB.

Referring to FIGS. 1, 4 and 6, power may be supplied again after the power loss SPO. The memory controller 200 (for example, the main firmware executor 210) may control the memory device 100 to read the power loss information SPO info. stored in 0-th page PG0 of the system block SB. The main firmware executor 210 may check the occurrence of the power loss SPO based on the power loss information SPO info. When the occurrence of the power loss SPO is checked, the main firmware executor 210 may control the memory device 100 to read the map data map data. The main firmware executor 210 may check a first erase page based on the map data map data. The first erase page may be, for example, the fourth page PG4 among the erase pages PG4 to PG10 in the user block UB.

The main firmware executor 210 may control the memory device 100 to store dummy data DUMMY in the first erase page, for example, the fourth page PG4 of the user block UB. The page in which the dummy data DUMMY is stored may be referred to as a dummy page. When performing a recovery operation, the dummy data DUMMY may be stored in a preset dummy page unit. In FIG. 6, for example, the dummy page unit may be one page. In this case, the dummy data DUMMY may be stored in one page (for example, the fourth page PG4 of the user block UB).

In some cases, the dummy page unit may be two pages. In this case, the dummy data DUMMY may be stored in the first erase page (for example, the fourth page PG4) of the user block UB, and a second erase page (for example, the fifth page PG5) of the user block UB. In other cases, the dummy page unit may be three or more pages.

The write data may be stored from an erase page next to the dummy page (for example, from the fifth page PG5) of the user block UB. In this case, the main firmware executor 210 may control the memory device 100 to store writing pointer information (writing pointer info.) in the system block SB. The writing pointer information may indicate a physical address of a page in which the write data is to be stored among the pages PG0 to PG10 in the user block UB, which is the open block. For example, writing pointer information may indicate the fifth page PG5 of the user block UB.

When the power is supplied again after the power loss SPO and the write request is received from the host 400, the memory controller 200 may control the memory device 100 to store the write data from, for example, the fifth page PG5 of the user block UB.

Figure 7:
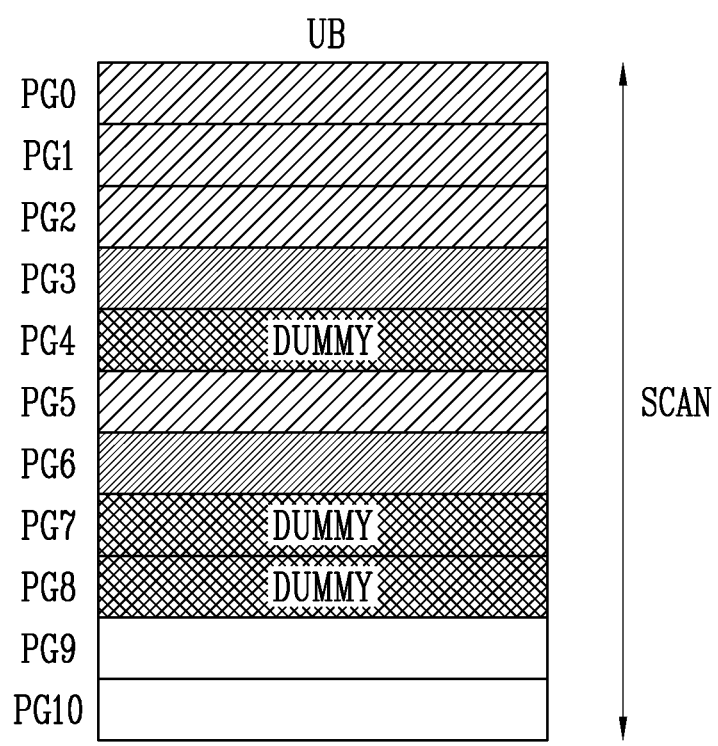
FIG. 7 illustrates an embodiment of measuring a number of power loss.

FIG. 7 is a diagram illustrating an embodiment of measuring the number of power losses. For illustrative purposes, the valid pages may correspond to a 0-th page PG0, the first page PG1, the second page PG2, and the fifth page PG5. The stop page may correspond to the third page PG3 and the sixth page PG6. The dummy page may correspond to the fourth page PG4, the seventh page PG7, and the eighth page PG8. And, the erase pages may correspond to the ninth page PG9 and the tenth page PG10, among the plurality of pages PG0 to PG10 in the user block UB, which is the open block shown in FIG. 7.

Referring to FIGS. 4 and 7, the power loss SPO may occur a plurality of times and may also occur during a recovery operation. In this case, the recovery operation for the power loss SPO may be performed a plurality of times, and thus a plurality of dummy pages may be generated.

The mode changer 220 may calculate the number of power losses based on the dummy data in the open block. In an embodiment, the mode changer 220 may calculate the number of power losses based on the number of dummy pages in the user block UB, which is the open block. For example, the mode changer 220 may scan the user block UB that is the open block. In this case, a scan direction may be a forward direction from the 0-th page PG0 to the tenth page PG10 or a reverse direction from the tenth page PG10 to the 0-th page PG0. Here, scanning the user block UB may include an operation of reading the plurality of pages PG0 to PG10 in the user block UB. When the dummy page unit is one page, the mode changer 220 may check the fourth page PG4, the seventh page PG7, and the eighth page PG8. Since the number of dummy pages in the user block UB is three in this example, the mode changer 220 may measure the number of power losses to be three times.

In an embodiment, the mode changer 220 may calculate the number of times (corresponding to the size of the dummy data stored in the open block) as the number of power losses. For example, the mode changer 220 may scan the user block UB (which is the open block), obtain the dummy data, and calculate the number of power losses corresponding to the size of the dummy data using a pre-stored conversion table.

The mode changer 220 may determine the sub firmware mode according to whether the number of power losses is greater than the reference number. For example, if the number of power losses is 3 and the reference number is 2, then the mode changer 220 may determine the firmware mode as the sub firmware mode because the number of power losses is greater than the reference number.

Figure 8:
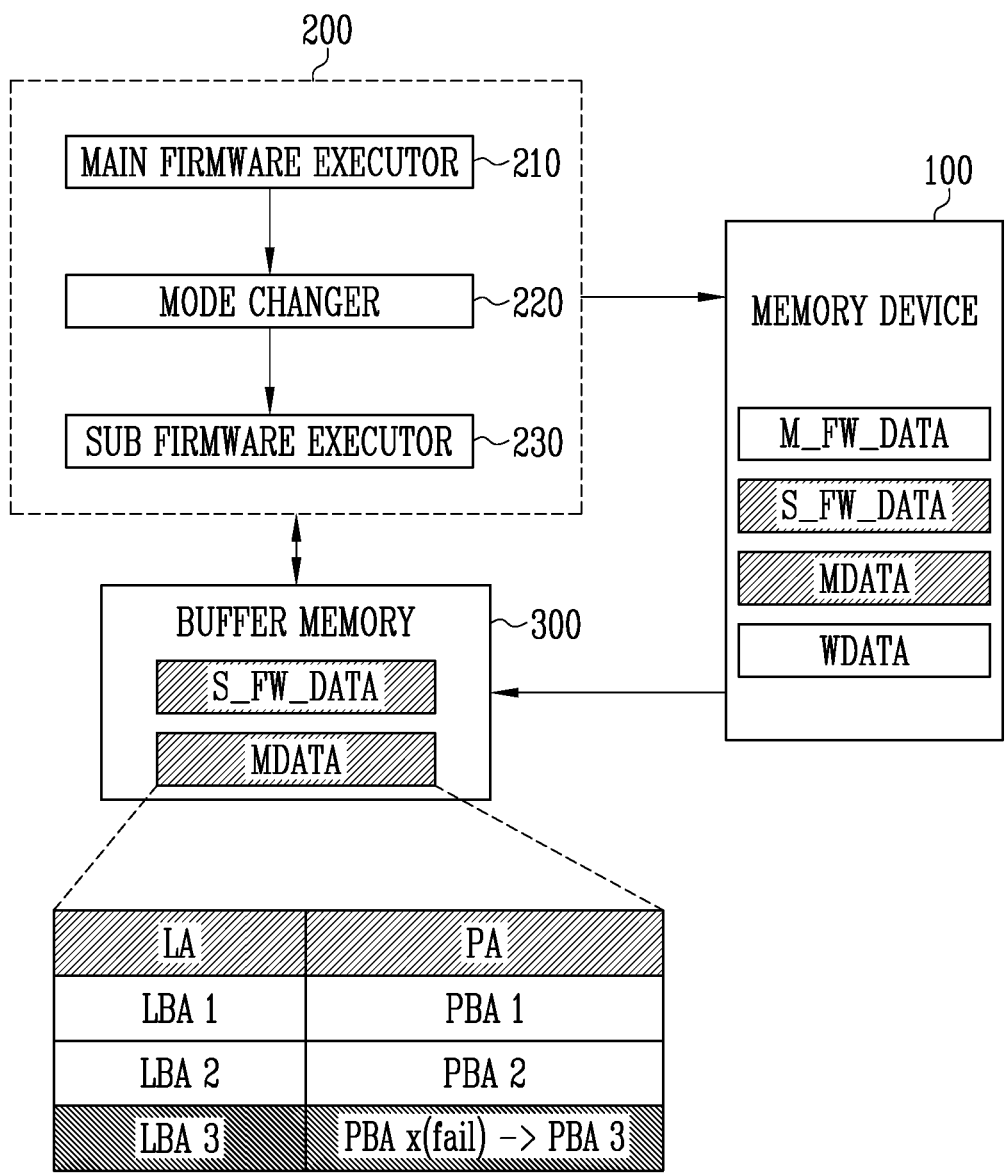
FIG. 8 illustrates an embodiment of executing sub firmware in a sub firmware mode.

FIG. 8 is a diagram illustrating an embodiment in which sub firmware is executed in a sub firmware mode.

Referring to FIGS. 5 to 8, the main firmware executor 210 may perform the recovery operation for the power loss SPO, and the mode changer 220 may determine the firmware mode as the sub firmware mode. In this case, the sub firmware executor 230 may control the memory device 100 to read the sub firmware data S_FW_DATA in the sub firmware mode.

The memory device 100 may perform a read operation of reading the sub firmware data S_FW_DATA, and may output the read sub firmware data S_FW_DATA. The sub firmware data S_FW_DATA may be data stored in the first memory block B1 in the firmware block group 101, as described above with reference to FIG. 3. The sub firmware executor 230 may load the read sub firmware data S_FW_DATA to the buffer memory 300.

In the sub firmware mode, the sub firmware executor 230 may execute the sub firmware according to the read sub firmware data S_FW_DATA. The sub firmware executor 230 may control the memory device 100 to read meta data MDATA for the recovery operation for the power loss. The meta data MDATA may be data stored in the N-th memory block BN in the system block group 102, as described above with reference to FIG. 3.

In an embodiment, the meta data MDATA may include map data map data shown in FIG. 6. The map data map data may indicate the mapping relationship between a logical address LA and a physical address PA. For example, a first logical address LBA 1 may be mapped to a first physical address PBA 1, and a second logical address LBA 2 may be mapped to a second physical address PBA 2. At this time, although a third logical address LBA 3 is to be mapped to a third physical address PBA 3, the third logical address LBA 3 may be incorrectly mapped to an x-th physical address PBA x due to the power loss SPO.

The sub firmware executor 230 may change an address that exceeds a preset range among the logical address and the physical address. In addition, the sub firmware executor 230 may control the memory device 100 to store the changed map data in the system block SB. For example, the sub firmware executor 230 may change the x-th physical address PBA x corresponding to the third logical address LBA 3, which is the map data, to the third physical address PBA 3. In addition, the memory device 100 may be controlled to store the map data including the third physical address PBA 3 corresponding to the third logical address LBA 3.

In one embodiment, the meta data MDATA may include the writing pointer information (writing pointer info.) and the map data map data shown in FIG. 6. The writing pointer information may indicate the physical address of the page in which the write data is to be stored among the pages in the open block. The map data map data may indicate the physical address of the erase page in the open block. In FIG. 6, for example, normal writing pointer information may indicate the ninth page PG9 or the tenth page PG10, and the map data map data may indicate physical addresses of each of the ninth page PG9 and the tenth page PG10.

The sub firmware executor 230 may change the writing pointer information according to whether the physical address of the page indicated by the writing pointer information corresponds to the physical address of the erase page indicated by the map data. In addition, the sub firmware executor 230 may control the memory device 100 to store the changed writing pointer information in the system block SB. For example, referring to FIG. 7, it is assumed that the abnormal writing pointer information indicates one page among the 0-th page PG0 to the eighth page PG8 and the map data indicates the physical addresses of the ninth page PG9 and the tenth page PG10. In this case, the physical address of the page indicated by the writing pointer information may not correspond to the physical address of the erase page indicated by the map data.

The sub firmware executor 230 may change the physical address of the erase page indicated by the writing pointer information to the physical address of the page indicated by the map data. In addition, the sub firmware executor 230 may control the memory device 100 to store the writing pointer information indicating the physical address of the page indicated by the changed map data.

As previously described, there is an effect in which reliability and performance of the storage device 1000 may be improved by autonomously correcting the error of the data, which is occurring due to the power loss.

Figure 9:
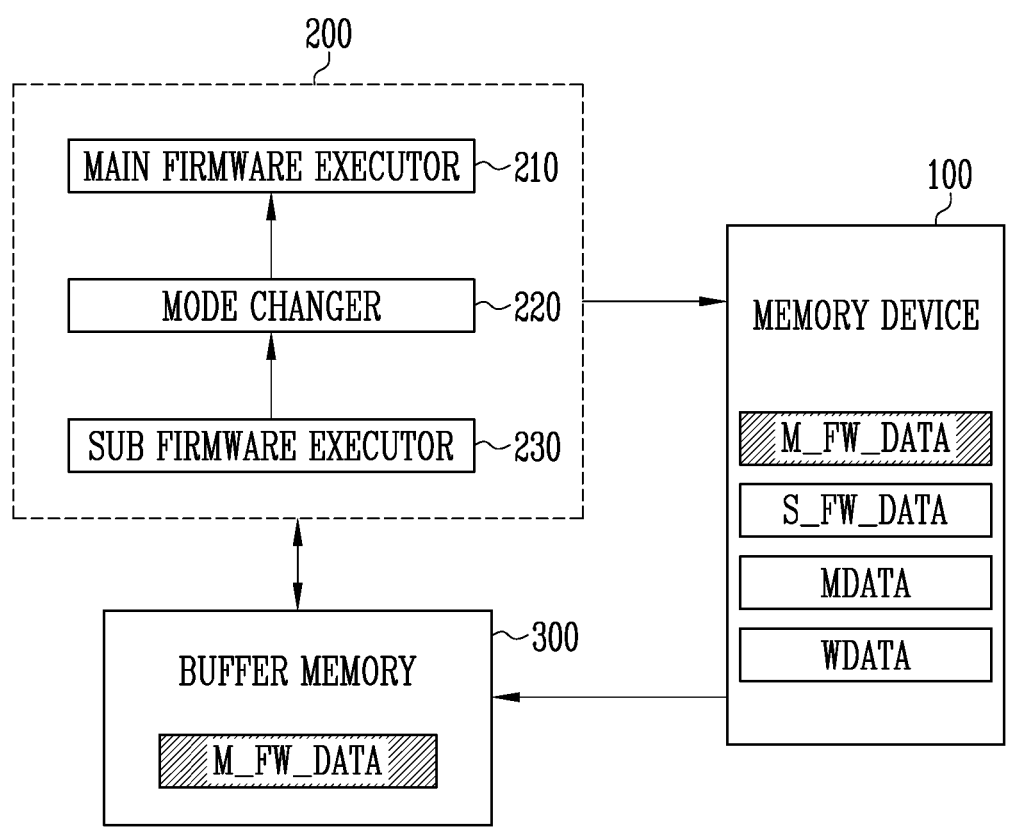
FIG. 9 illustrates an embodiment of changing from a sub firmware mode to a main firmware mode.

FIG. 9 is a diagram illustrating an embodiment of changing from a sub firmware mode to a main firmware mode.

Referring to FIG. 9, when execution of the sub firmware is completed, the sub firmware executor 230 may provide a signal indicating that the sub firmware is completed to the mode changer 220. The mode changer 220 may change the firmware mode from the sub firmware mode to the main firmware mode in response to the signal from the sub firmware executor 230, and may provide a signal indicating that the firmware mode is the main firmware mode to the main firmware executor 210.

The main firmware executor 210 may control the memory device 100 to read the main firmware data M_FW_DATA in response to determination of the main firmware mode. The memory device 100 may perform an operation of reading the stored main firmware data M_FW_DATA and outputting the read main firmware data M_FW_DATA. The main firmware data M_FW_DATA may be data stored in the 0-th memory block B0 in the firmware block group 101, for example, as described above with reference to FIG. 3. The main firmware executor 210 may load the read main firmware data M_FW_DATA to the buffer memory 300.

When the main firmware data M_FW_DATA is read, the main firmware executor 210 may perform a rebooting operation using the main firmware data M_FW_DATA. When the rebooting operation is completed, the main firmware executor 210 may provide the booting completion response to the host 400.

Figure 10:
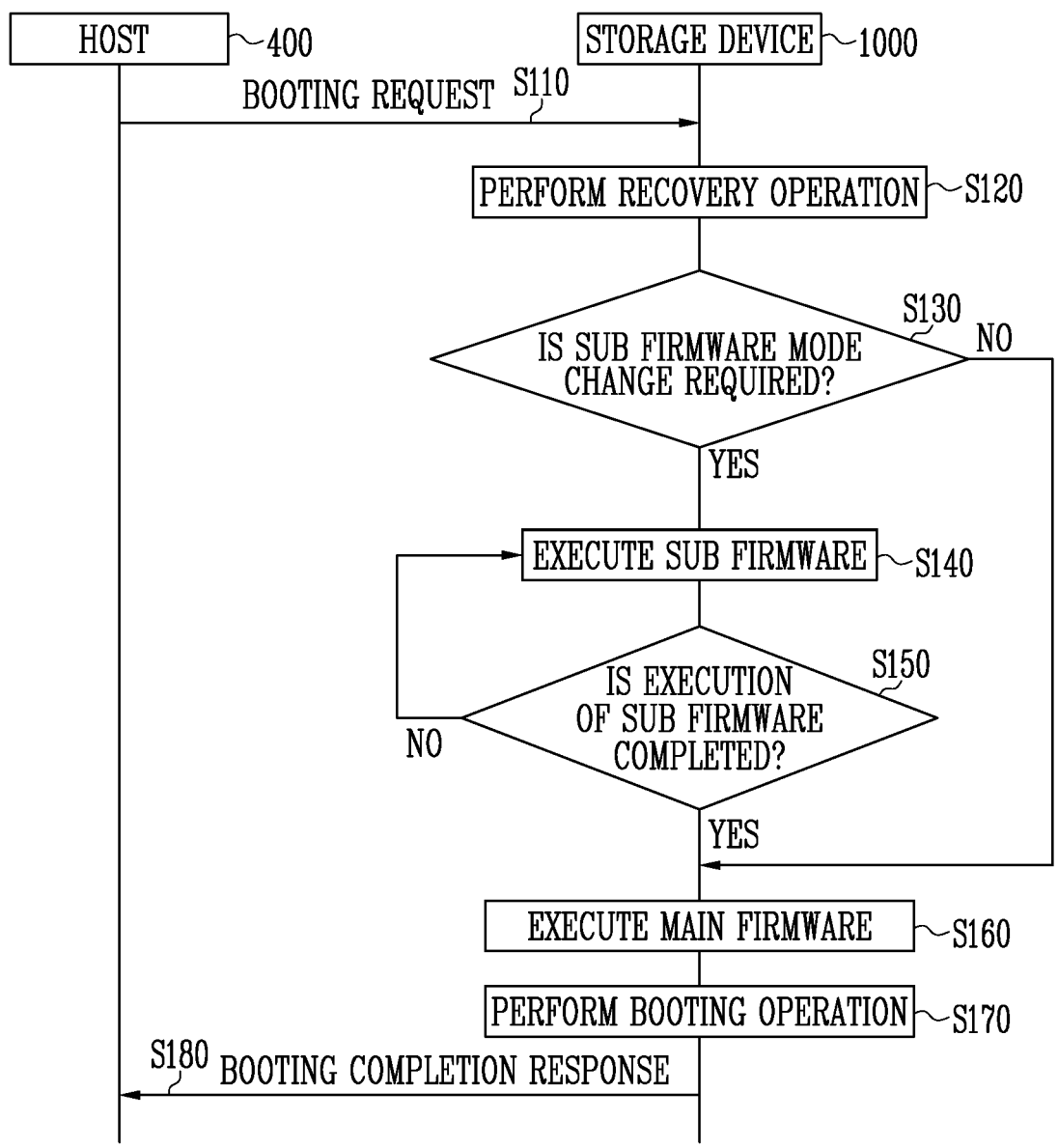
FIG. 10 illustrates an embodiment of a method of operating a storage device.

FIG. 10 is a diagram illustrating an embodiment of a method of operating a storage device. Referring to FIG. 10, the method includes, at S110, the host 400 providing the booting request to the storage device 1000.

At S120, assuming that a power loss SPO occurs before, the storage device 1000 performs the recovery operation for the power loss SPO.

At S130, when the recovery operation is performed, the storage device 1000 determines whether the firmware mode is to be changed to the sub firmware mode. As described above with reference to FIG. 7, the storage device 1000 may calculate the number of power losses based on the size of the dummy page or the dummy data in the user block UB that is the open block. The storage device 1000 may then determine that the firmware mode is to be changed to the sub firmware mode by checking whether the number of power losses is greater than the reference number.

At S140, when the sub firmware mode may be started (e.g., S130, Yes), the storage device 1000 starts the sub firmware mode and executes the sub firmware in the sub firmware mode. As described with reference to FIG. 8, the storage device 1000 may execute the sub firmware according to the sub firmware data S_FW_DATA in the sub firmware mode, and may correct map data in which the mapping relationship between the logical address LA and the physical address PA is incorrect. In one embodiment, the storage device 1000 may correct writing pointer information (writing pointer info.) in which the physical address of the page in which the write data is to be stored is incorrect.

At S150, a determination is made as to whether execution of the sub firmware is completed.

At S160, when execution of the sub firmware is completed (S150, Yes) or when the sub firmware mode is not to be started (S130, No), the storage device 1000 executes the main firmware. For example, the storage device 1000 may load the main firmware data M_FW_DATA and execute the main firmware using the main firmware data M_FW_DATA.

At S170, the storage device 1000 performs the booting operation using the main firmware.

At S180, the storage device 100 provides the booting completion response to the host 400.

Figure 11:
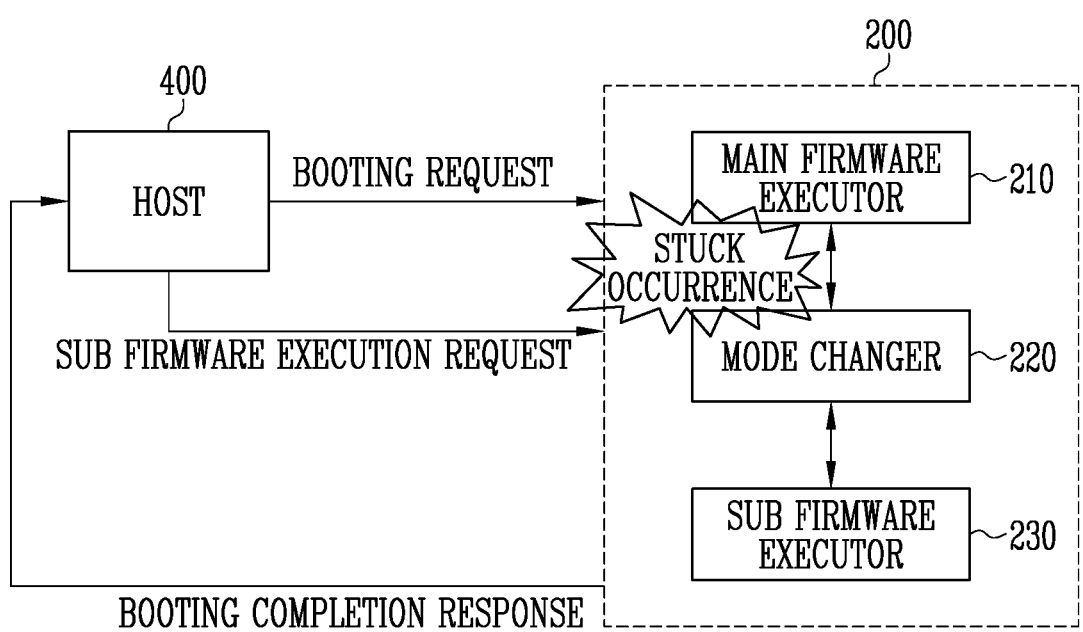
FIG. 11 illustrates an embodiment of outputting a booting completion response to a sub firmware execution request.

FIG. 11 is a diagram illustrating an embodiment of outputting a booting completion response to a sub firmware execution request.

Referring to FIG. 11, the memory controller 200 may not respond to the booting request from the host 400, e.g., a stuck condition has occurred in the memory controller 200. In one embodiment, even though the main firmware executor 210 receives the booting request from the host 400, the main firmware executor 210 may not perform any operation and may be stuck. Accordingly, the mode changer 220 may not perform an operation.

When the stuck repeatedly occurs in the memory controller 200 during a predetermined event period, the host 400 may provide the sub firmware execution request to the memory controller 200. The memory controller 200 may execute the sub firmware in response to the sub firmware execution request of the host 400. For example, the sub firmware executor 230 may obtain the sub firmware data S_FW_DATA from the memory device 100 in response to the sub firmware execution request and may execute the sub firmware according to the sub firmware data S_FW_DATA. The sub firmware may be, for example, the same as described with reference to FIG. 8.

In one embodiment, when the memory controller 200 does not provide a booting completion response to the booting request from the host 400 for a preset period, the memory controller 200 may execute the sub firmware regardless of the sub firmware execution request. For example, when the main firmware executor 210 is stuck, the mode changer 220 may also not perform operations of calculating the number of power losses and selecting the firmware mode according to the result of comparing the number of power losses and the reference number. When the sub firmware executor 230 does not receive a signal indicating the sub firmware mode from the mode changer 220, from a time when the booting request is provided to a time when a preset period elapses, the sub firmware executor 230 may execute the sub firmware.

When the execution of the sub firmware is completed, the sub firmware executor 230 may provide the signal indicating that the sub firmware is completed to the mode changer 220. The mode changer 220 may then change the firmware mode from the sub firmware mode to the main firmware mode. The main firmware executor 210 may perform the booting operation using the main firmware data M_FW_DATA in response to the determination of the main firmware mode, and may provide a booting completion response to the host 400 after the booting operation is completed. The main firmware executor 210 may check whether booting operation is normally completed by executing the verify firmware data during the booting operation.

As described above, even though the storage device 1000 is stuck, the host 400 may control the storage device 1000 to perform the sub firmware, As a result, performance of the storage device 1000 may be improved, along with reliability of the storage device 1000.

Figure 12:
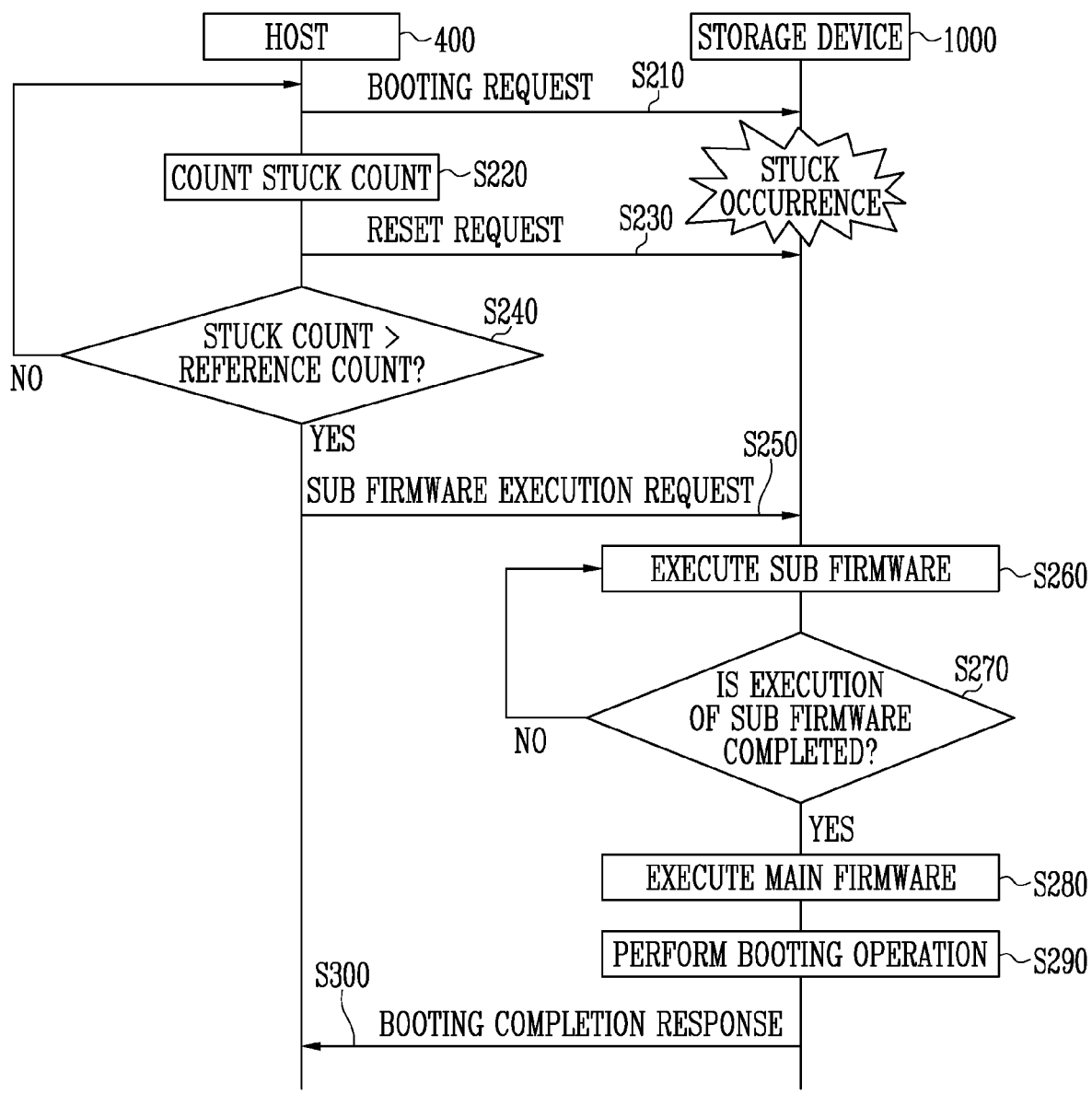
FIG. 12 illustrates an embodiment of a method of operating a storage device.

FIG. 12 is a diagram illustrating an embodiment of a method of operating a storage device. In this embodiment, it may be assumed that the storage device 1000 shown in FIG. 12 does not output a response to the booting request of the host 400 and the stuck condition exists.

Referring to FIG. 12, the method includes, at S210, the host 400 providing the booting request to the storage device 1000. Because a stuck condition exists in the storage device 1000, the booting completion response to the booting request may not be provided to the host 400.

At S220, when the booting completion response is not provided to the host 400 during the response waiting time, host 400 counts a stuck count.

At S230, host 400 provides a reset request to the storage device 1000.

At S240, host 400 determines whether the stuck count is greater than a preset reference count. When the stuck count is less than or equal to the reference count (S240, No), operations S210, S220, S230 and S240 are performed until the stuck count is greater than the reference count.

At S250, when the stuck count is greater than the reference count (S240, Yes), host 400 provides the sub firmware execution request to the storage device 1000.

At S260, the storage device 1000 may execute the sub firmware in response to the sub firmware execution request. This may be the same as described with reference to FIG. 8. In one embodiment, the storage device 1000 may determine whether a booting completion response to the booting request is provided to the host 400 in a preset period without the reset request and the sub firmware execution request. Thus, the sub firmware may be autonomously performed. This may be the same as described with reference to FIG. 11.

At S270, the storage device 1000 checks whether the execution of the sub firmware is completed. When the sub firmware is being executed (S270, No), operation S260 may be performed.

At S280, when the execution of the sub firmware is completed (S270, Yes), the storage device 1000 executes the main firmware. This may be the same as described with reference to FIG. 9.

At S290, the storage device 1000 performs a booting operation using the main firmware.

At S300, the storage device 1000 provides a booting completion response to the host 400.

Figure 13:
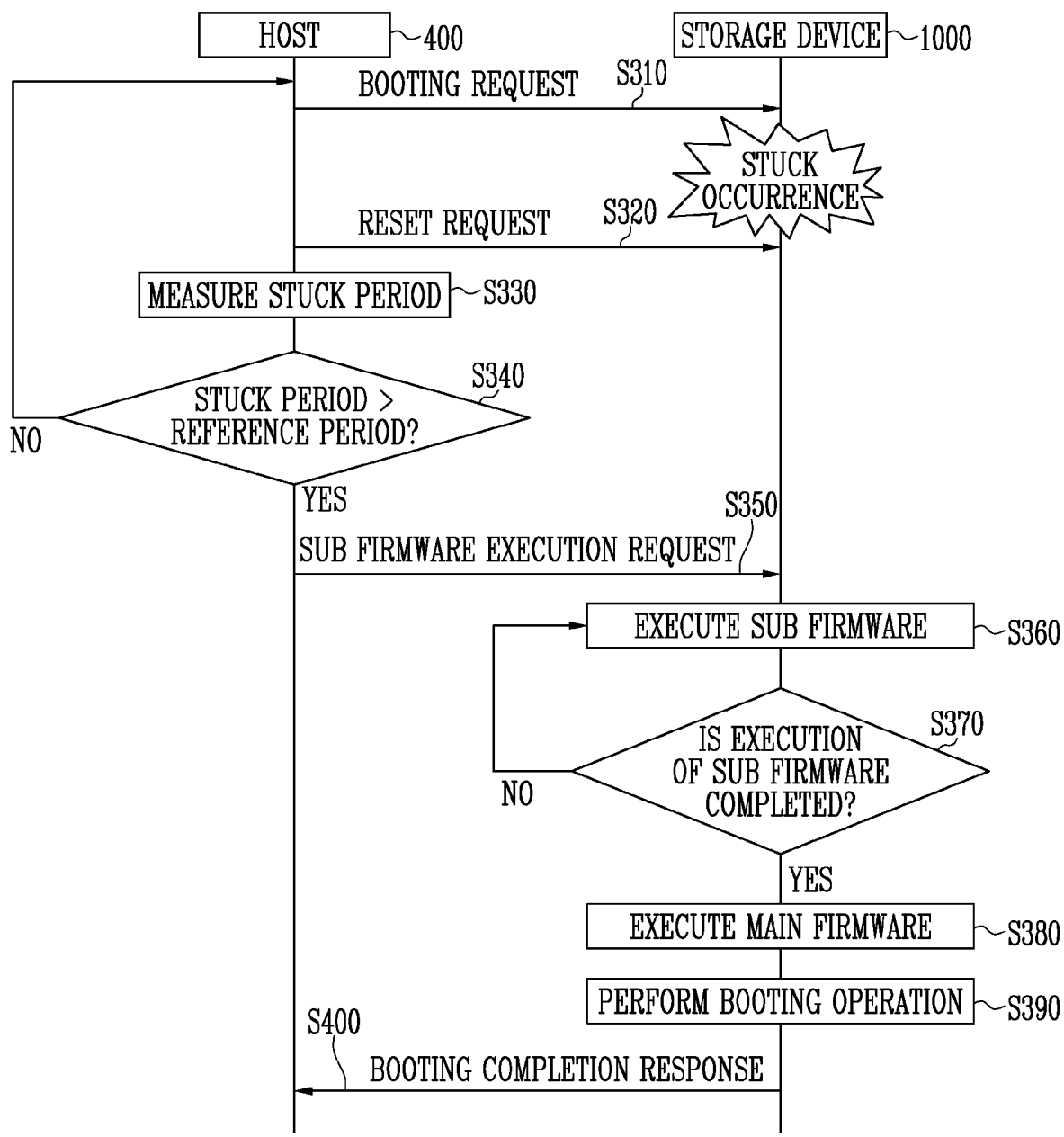
FIG. 13 illustrates an embodiment of a method of operating a storage device.

FIG. 13 is a diagram illustrating an embodiment of a method of operating a storage device. In FIG. 13, it is assumed that the storage device 1000 shown in FIG. 13 does not output a response to the booting request of the host 400 and the stuck condition exists, for example, in the manner indicated in FIG. 12.

Referring to FIG. 13, the method includes, at S310, the host 400 providing the booting request to the storage device 1000. Because a stuck condition exists in the storage device 1000, a booting completion response to the booting request may not be provided to the host 400.

At S320, when the booting completion response is not provided to the host 400 during the response waiting time, the host 400 provides the reset request to the storage device 1000.

At S330, the host 400 measures a stuck period after the reset request is provided. The stuck period may include a period in which the storage device 1000 does not respond.

At S340, the host 400 determines whether the stuck period is longer than a preset reference period. When the stuck period is less than or equal to a reference period (S340, No), operations S310, S320, S330 and S340 may be performed until the stuck period is longer than the reference period.

At S350, when the stuck period is longer than the reference period (S340, Yes), the host 400 provides the sub firmware execution request to the storage device 1000.

Operations S360, S370, S380, S390, and S400 may be the same as operations S260 to S300 described with reference to FIG. 12. In one embodiment, storage device 1000 may autonomously execute the sub firmware without a reset request and sub firmware execution request. This may be the same as described with reference to FIG. 11.

Figure 14:
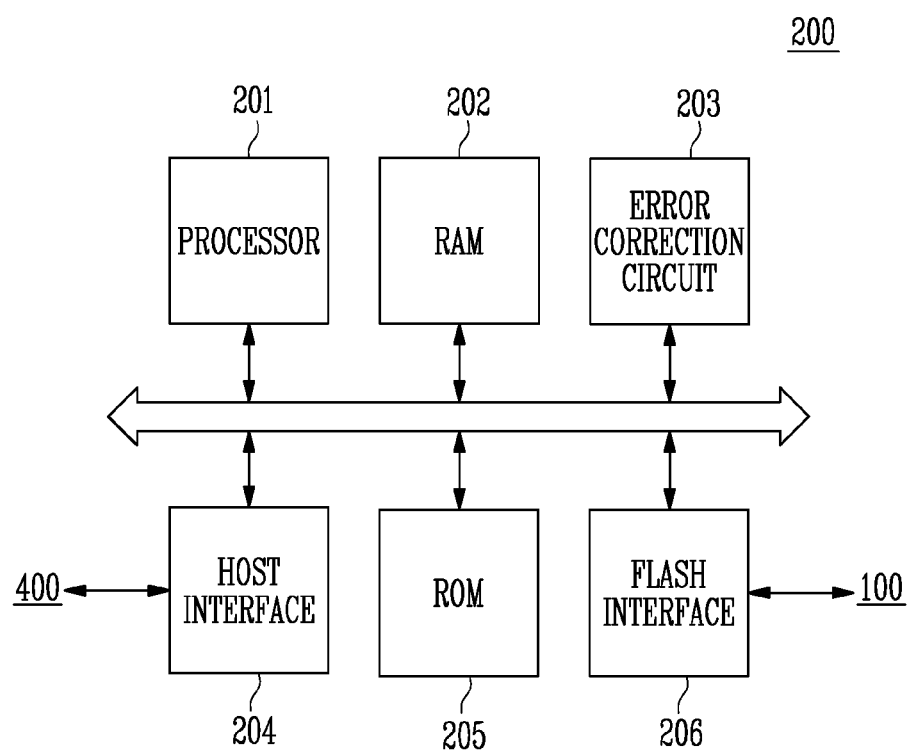
FIG. 14 illustrates an embodiment of a memory controller.

FIG. 14 is a diagram illustrating an embodiment of a memory controller 200, which may include a processor 201, a RAM 202, an error correction circuit 203, a host interface 204, a ROM 250, and a flash interface 206.

The processor 201 may control overall operation of the memory controller 200.

The RAM 202 may be used as a buffer memory, a cache memory, an operation memory, or another type of storage area of the memory controller 200. For example, RAM 202 may be a buffer memory.

The error correction circuit 203 may generate an error correction code (ECC) for correcting a fail bit or an error bit of data received from the memory device 100. The error correction circuit 203 may perform error correction encoding of data provided to the memory device 100, in order to generate data to which a parity bit is added. The parity bit may be stored, for example, in the memory device 100.

The error correction circuit 203 may perform error correction decoding on the data output from the memory device 100. At this time, the error correction circuit 203 may correct an error using parity. For example, the error correction circuit 203 may correct the error using various coded modulations. Examples include an LDPC code, BCH code, turbo code, Reed-Solomon code, convolutional code, RSC, TCM, and BCM.

The error correction circuit 203 may calculate an error correction code value of data to be programmed to the memory device 100 in the program operation. The error correction circuit 203 may perform an error correction operation based on the error correction code value on data read from the memory device 100 in the read operation. The error correction circuit 203 may perform an error correction operation of data recovered from the memory device 100 in a recovery operation of failed data.

The memory controller 200 may communicate with an external device (for example, the host 400, an application processor, and/or another device) through the host interface 204.

The ROM 205 may store various items of information to operate the memory controller 200 in a firmware form.

The memory controller 200 may communicate with the memory device 100, for example, through the flash interface 206. The memory controller 200 may transmit commands CMD, addresses ADDR, control signals CTRL, and/or other information to the memory device 100 and may receive data through the flash interface 206. The flash interface 206 may include, for example, a NAND interface.

Figure 15:
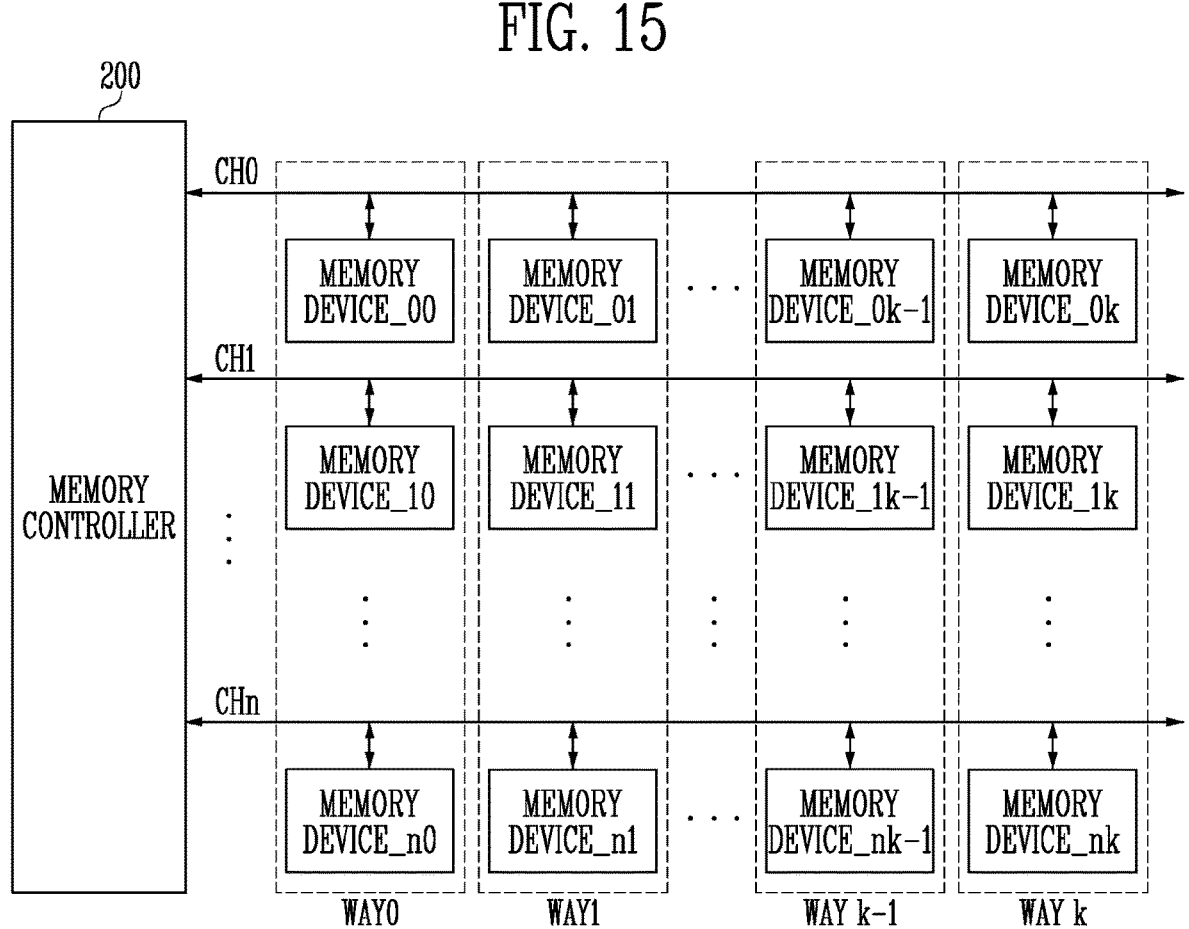
FIG. 15 illustrates an example of a connection relationship between a memory controller and a plurality of memory devices.

FIG. 15 is a diagram exemplarily illustrating an embodiment of a connection relationship between a memory controller and a plurality of memory devices.

Referring to FIG. 15, the memory controller 200 may be connected to memory device_00 to memory device_nk through a plurality of channels CH0 to CHk. In an embodiment, the number of channels or the number of memory devices connected to each channel may vary among embodiments.

The memory device_00 to the memory device_0k may be commonly connected to the channel 0 CH0 and may communicate with the memory controller 200 through the channel 0 CH0. Because the memory device_00 to the memory device_0k are commonly connected to the channel 0 CH0, only one memory device may communicate with the memory controller 200 at a time. However, internal operations of one or more of the memory device_00 to the memory device_0k may be simultaneously performed. The memory devices (for example, memory device_10 to the memory device_nk) connected to the channel 1 CH1 to the channel n CHn may operate, for example, in the same manner as memory device_00 to the memory device_0k connected to the channel 0 CH0 described above.

A storage device using the memory device_00 to the memory device_nk may improve performance using data interleaving, which is data communication using an interleave method. The data interleaving may include performing a data read or write operation while moving in a structure in which two or more ways share one channel. To support data interleaving, the memory devices may be managed in a way unit with the channel. In order to increase or maximize parallelism of the memory devices connected to each channel, memory controller 200 may distribute and allocate consecutive logical memory regions to the channel and the way.

The memory controller 200 may transmit data and a control signal including a command and an address to the memory device_00 through the channel 0 CH0. While the memory device_00 programs the transmitted data in a memory cell included therein, the memory controller 200 may transmit the data and the control signal including the command and the address to the memory device_01.

The memory device_00 to the memory device_nk may include n ways WAY0 to WAYn. WAY0 may include memory device_00 to memory device_n0. Memory device_01 to memory device_nk in WAY1 to WAY k may be configured, for example, as memory device_00 to memory device_n0 in WAY0, as described above. Each of the channels CH0 to CHn may include a bus of signals shared by the memory devices that are connected to corresponding ones of the channels.

Although data interleaving in the n channel/k way structure is described as an example in FIG. 15, in some cases interleaving efficiency may be more efficient as the number of channels and the number of ways increases.

Figure 16:
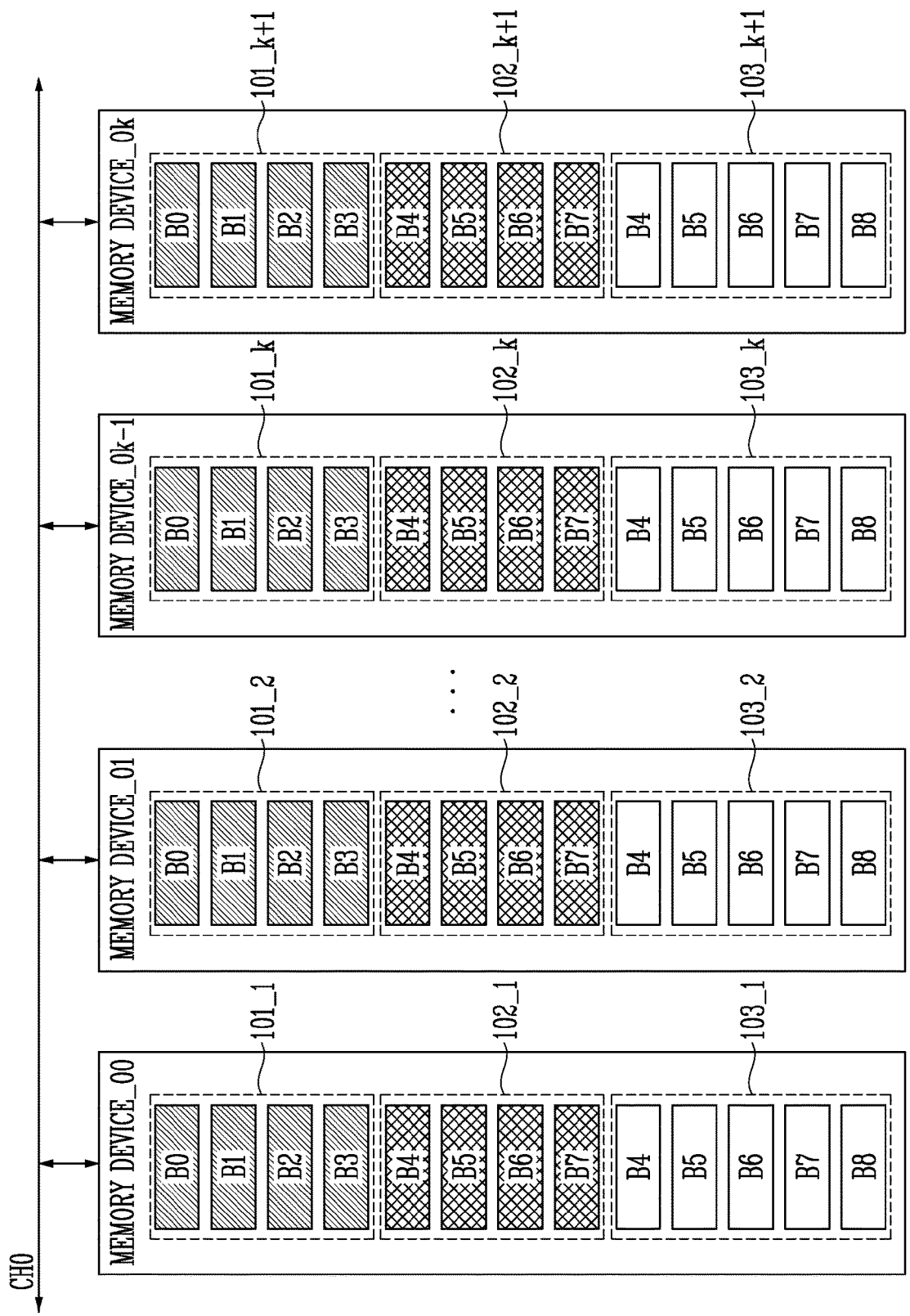
FIG. 16 illustrates an embodiment of a firmware block group, a system block group, and a user block group in each of a plurality of memory devices.

FIG. 16 is a diagram illustrating examples of a firmware block group, a system block group, and a user block group included in each memory device.

Referring to FIG. 16, memory device_00 to memory device_0k may be commonly connected to the channel 0 CH0. Each of memory device_00 to memory device_0k may include a plurality of memory blocks B0 to B8. In FIG. 16, an example of the memory blocks B0 to B8 are shown to include a 0-th memory block B0 to an eighth memory block B8, but the number of memory blocks may be different in another embodiment.

Each of memory device_00 to memory device_0k may include a firmware block group, a system block group, and a user block group. For example, the memory device_00 may include a firmware block group 101_1, a system block group 102_1, and a user block group 103_1. The memory device_01 may include a firmware block group 101_2, a system block group 102_2, and a user block group 103_3. The memory device_0k–1 may include a firmware block group 101_k, a system block group 102_k, and a user block group 103_k. The memory device_0k may include a firmware block group 101_k+1, a system block group 102_k+1, and a user block group 103_k+1.

In an embodiment, the firmware block groups 101_1, 101_2, 101_k, and 101_k+1 in each memory device may include the main firmware data and the sub firmware data.

The memory controller may control memory blocks in memory devices that are commonly connected to one channel, which, for example, may form a super block, e.g., the fourth memory blocks B4 in memory device_00 to memory device_0k may configure a super block, which, for example, may include super pages.

The memory controller may store or read data in a super page unit in storing data in memory device_00 to memory device_0k or reading the stored data from memory device_00 to memory device_0k. In this case, a program operation of storing the data in one super page or a read operation of reading the stored data may be performed using a data interleaving method.

In one embodiment, memory device_0k may store parity data. For example, memory device_0k may store parity data generated by performing logical (e.g., an exclusive OR (XOR)) operation on data stored in memory device_00 to memory device_0k–1. When one of a plurality of page data in one super page is read-failed, the memory controller may recover page data stored in the read-failed memory device by performing the logical operation on the remaining page data and the parity data using the parity data. The logical operation may be different from an XOR operations in another embodiment.

Figure 17:
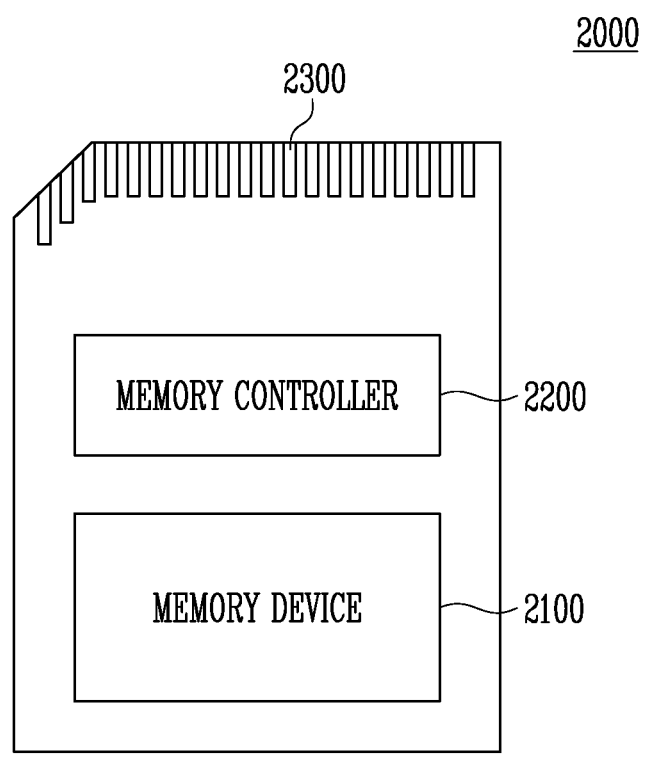
FIG. 17 illustrates an embodiment of a memory card.

FIG. 17 is a block diagram illustrating an embodiment of a memory card system 2000 to which a storage device according to the embodiments described herein may be applied.

Referring to FIG. 17, the memory card system 2000 includes a memory device 2100, a memory controller 2200, and a connector 2300. The memory device 2100 may be a nonvolatile memory. Examples include an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetoresistive RAM (STT-MRAM).

The memory controller 2200 is connected to and configured to access the memory device 2100. For example, the memory controller 2200 may be configured to control read, write, erase, and background operations of the memory device 2100. The memory controller 2200 is configured to serve as an interface between the memory device 2100 and the host 400. The memory controller 2200 is configured to drive instructions (e.g., firmware) for controlling the memory device 2100. The memory controller 2200 may be implemented as memory controller 200 described with reference to FIG. 1.

The memory controller 2200 may include, for example, components such as a random access memory (RAM), a processor, a host interface, a memory interface, and/or an error correction circuit. The memory controller 2200 may communicate with an external device through the connector 2300. The memory controller 2200 may communicate with an external device (for example, the host 400) according to one or more communication standards. Examples of the communication standards include a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. The connector 2300 may be compatible with at least one of the communication standards described above.

The memory device 2100 and memory controller 2200 may be integrated into one semiconductor device to configure a memory card. Examples of the memory card include a PC card (personal computer memory card international association (PCMCIA)), a compact flash card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 18:
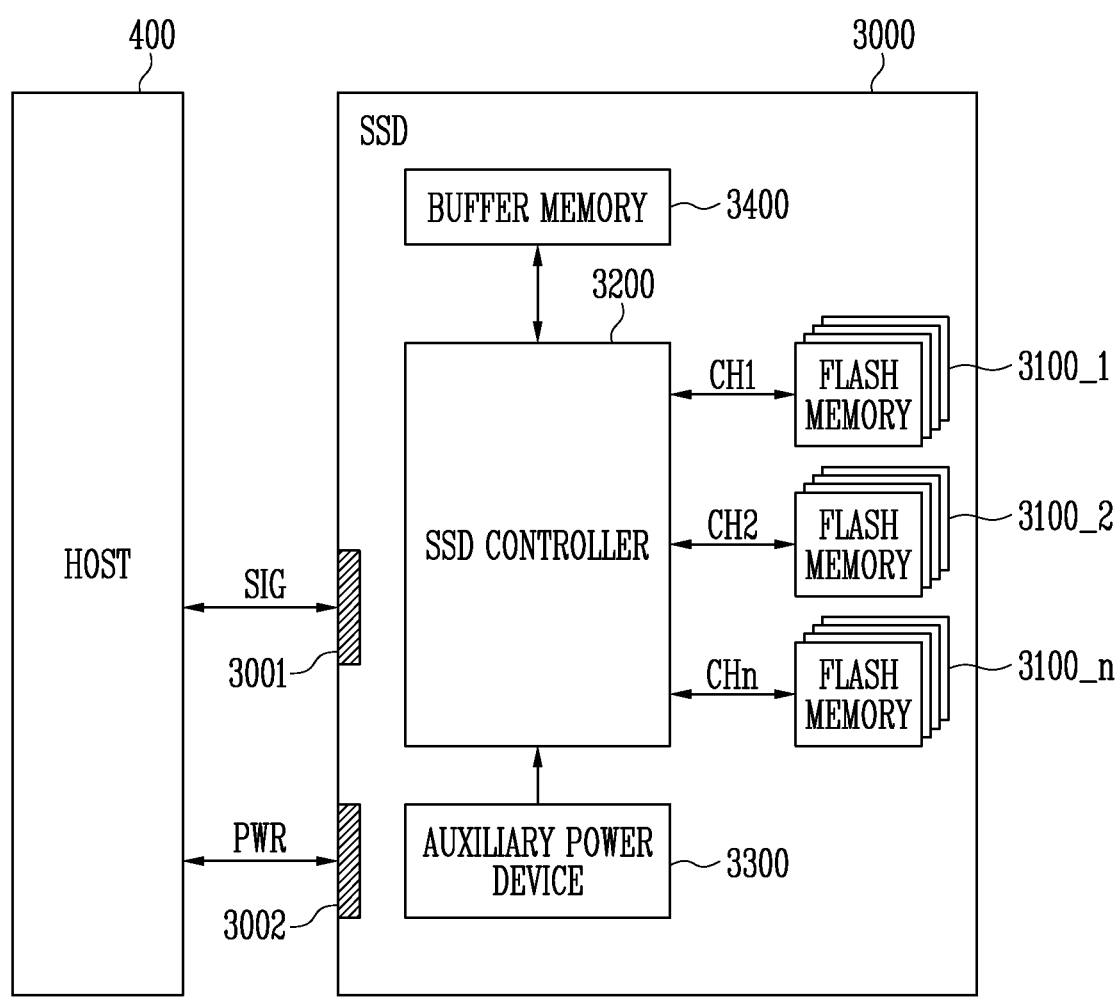
FIG. 18 illustrates an embodiment of a solid state drive system.

FIG. 18 is a block diagram illustrating an embodiment of a solid state drive (SSD) system to which a storage device according to the embodiments described herein may be applied.

Referring to FIG. 18, the SSD system may include the host 400 and an SSD 3000. The SSD 3000 exchanges a signal SIG with the host 400 through a signal connector 3001 and receives power PWR through a power connector 3002. The SSD 3000 includes an SSD controller 3200, a plurality of flash memories 3100_1, 3100_2, to 3100_n, an auxiliary power device 3300, and a buffer memory 3400.

According to an embodiment, the SSD controller 3200 may perform the function of the memory controller 200 described with reference to FIG. 1. The SSD controller 3200 may control flash memories 3100_1, 3100_2, and 3100_n in response to the signal SIG from the host 400. For example, the signal SIG may be based on an interface between host 400 and SSD 3000. Examples of the interface include a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3300 is connected to the host 400 through the power connector 3002 and may receive power PWR from host 400 and perform a charging operation based on the power. The auxiliary power device 3300 may provide power of the SSD 3000 when power supply from the host 400 does not conform to a predetermined level or pattern, e.g., is not smooth. For example, the auxiliary power device 3300 may be positioned inside or outside and coupled to the SSD 3000. For example, the auxiliary power device 3300 may be positioned on a main board and may provide auxiliary power to the SSD 3000.

The buffer memory 3400 may temporarily store data, for example, received from the host 400 or data received from the flash memories 3100_1, 3100_2, and 3100_n, or may temporarily store meta data (for example, a mapping table) of the flash memories 3100_1, 3100_2, and 3100_n. The buffer memory 3400 may include a volatile memory, such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 19:
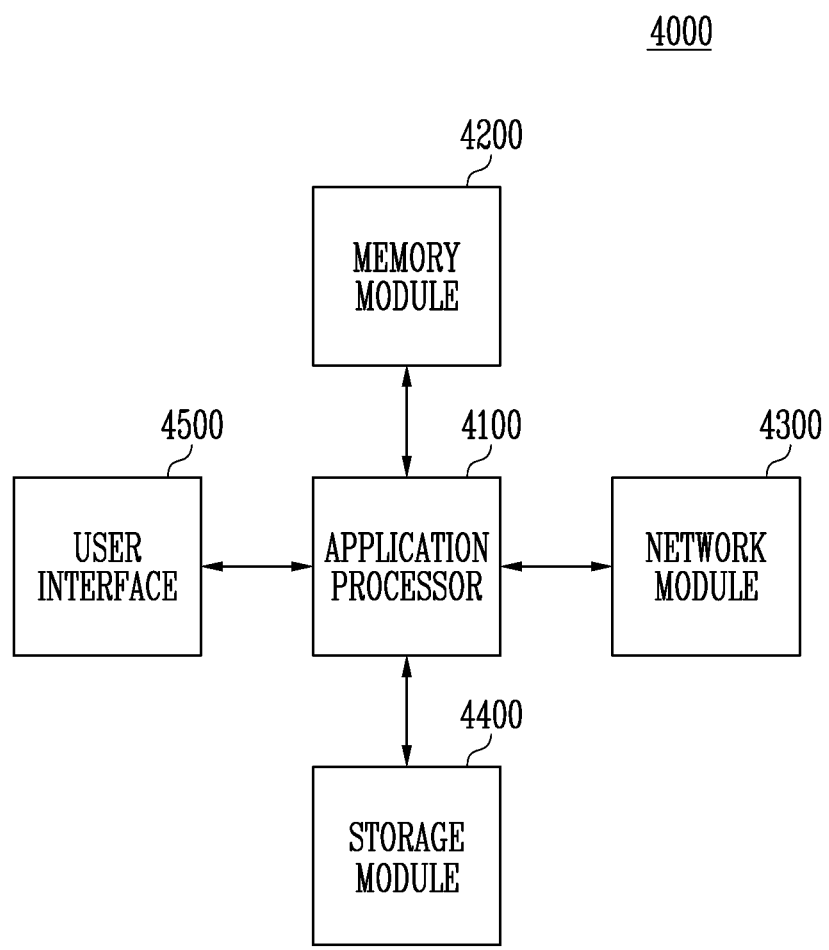
FIG. 19 illustrates an embodiment of a user system.

FIG. 19 is a block diagram illustrating an embodiment of a user system 4000, to which a storage device according to the embodiments described herein may be applied.

Referring to FIG. 19, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and/or other features that control the components in the user system 4000. The application processor 4100 may be provided, for example, as a system-on-chip (SoC).

The memory module 4200 may operate as a main memory, an operation memory, a buffer memory, or a cache memory of the user system 4000. The memory module 4200 may include a volatile random access memory. Examples include a volatile random access memory (e.g., DRAM, SDRAM, DDR SDRAM, DDR2 SDRAM, DDR3 SDRAM, LPDDR SDARM, LPDDR2 SDRAM, LPDDR3 SDRAM) or a nonvolatile random access memory (e.g., PRAM, ReRAM, MRAM, FRAM). The application processor 4100 and memory module 4200 may be packaged, for example, as a package on package (POP) and may be provided as one semiconductor package.

The network module 4300 may communicate with one or more external devices. For example, the network module 4300 may support wireless communication, such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. The network module 4300 may be in or coupled to the application processor 4100.

The storage module 4400 may store data, for example, received from the application processor 4100. In one embodiment, the storage module 4400 may transmit data stored in the storage module 4400 to the application processor 4100. The storage module 4400 may be implemented, for example, with a nonvolatile semiconductor memory, e.g., a phase-change RAM (PRAM), magnetic RAM (MRAM), resistive RAM (RRAM), NAND flash, NOR flash, or a three-dimensional NAND flash. In one embodiment, the storage module 4400 may be provided as a removable storage device (removable drive), e.g., a memory card or an external drive of the user system 4000.

The storage module 4400 may operate, for example, in a manner similar to storage device 1000 described with reference to FIG. 8. The storage module 4400 may include a plurality of nonvolatile memory devices, and the plurality of nonvolatile memory devices may operate in a manner similar to memory device 100 described with reference to FIG. 1.

The user interface 4500 may include interfaces for inputting data or instructions to the application processor 4100, and/or for outputting data to an external device. Examples of user input interfaces include a keyboard, a keypad, a button, a touch panel, a touch screen, a touch pad, a touch ball, a camera, a microphone, a gyroscope sensor, a vibration sensor, and a piezoelectric element. Examples of user output interfaces such as a liquid crystal display (LCD), an organic light emitting diode (OLED) display device, an active matrix OLED (AMOLED) display device, an LED, a speaker, and a monitor.

In one embodiment, an apparatus includes at least one storage area and a controller. The at least one storage area is configured to store first instructions and second instructions. The first instructions may correspond, for example, to main firmware and the second instructions may correspond, for example, to sub firmware as previously discussed.

The controller may be any one of the embodiments of the memory controller described herein. For example, the controller may be configured to execute the first instructions when a number of power losses occurring over a period is less than a predetermined number and to execute the second instructions when the number of power losses is greater than or equal to the predetermined number. The first instructions may correspond to a booting operation, and the second instructions, when executed by the controller, may cause the controller to correct an error in meta data that resulted from at least one of the number of power losses. The meta data may correspond to stored data.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described, code or instructions for implementing the operations of the method embodiments may transform the computer, processor, controller, or other signal processing device into a special-purpose processor for performing the methods herein.

When implemented in at least partially in software, the controllers, processors, devices, modules, executors, units, multiplexers, generators, logic, interfaces, decoders, drivers, mode changers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments and drawings are only examples to facilitate an understanding of the present disclosure, and the present disclosure is not limited thereto. It should be apparent to those skilled in the art that various modifications can be made on the basis of the technological scope of the present disclosure.

The embodiments may be combined to form additional embodiments.

What is claimed is:

1. A storage device comprising:
a memory device including a firmware block group configured to store main firmware data of main firmware for performing an operation according to an operation request provided from a host and sub firmware data of sub firmware for correcting an error of data related to power losses, and a user block group configured to store write data; and
a memory controller, in response to a booting request provided from the host, configured to:
count a number of previously generated power losses based on data stored in an open block in the user block group in a booted state based on the main firmware data,
perform a rebooting operation using the sub firmware data when the number of power losses exceeds a reference number, and execute the sub firmware to correct the error of the data related to the power losses.

2. The storage device of claim 1, wherein
the open block includes a valid page that stores valid data, a stop page at which storage of data is stopped due to power loss, a dummy page that stores dummy data, and an erase page that is to store data, and
the memory controller comprises:
a main firmware executor configured to control the memory device to store the dummy data in the erase page;
a mode changer configured to calculate the number of power losses based on the dummy page in the open block and change a firmware mode from a main firmware mode to a sub firmware mode when the number of power losses is greater than the reference number; and
a sub firmware executor configured to control the memory device to read the sub firmware data in response to the change to the sub firmware mode, and execute the sub firmware using the read sub firmware data.

3. The storage device of claim 2, further comprising:
a buffer memory configured to temporarily store data, wherein the memory device is configured to include
a system block that stores meta data related to the write data, and loads the meta data to the buffer memory device under control of the memory controller, after completion of the rebooting operation using the sub firmware data.

4. The storage device of claim 3, wherein the meta data includes map data indicating a mapping relationship between a logical address and a physical address of the write data.

5. The storage device of claim 4, wherein the sub firmware executor is configured to control the memory device to
change an address exceeding a preset range among the logical address and the physical address, and
store changed map data in the system block.

6. The storage device of claim 3, wherein the meta data includes
writing pointer information indicating a physical address of a page in which the write data is to be stored among a plurality of pages in the open block, and map data indicating a physical address of an erase page in the open block.

7. The storage device of claim 6, wherein the sub firmware executor is configured to
change the writing pointer information according to whether the physical address of the page indicated by the writing pointer information corresponds to the physical address of the erase page indicated by the map data, and
control the memory device to store the changed writing pointer information in the system block.

8. The storage device of claim 2, wherein
the mode changer is configured to change the firmware mode from the sub firmware mode to the main firmware mode in response to completion of the execution of the sub firmware, and
the main firmware executor is configured to control the memory device to read the main firmware data in response to the change to the main firmware mode and performs the rebooting operation using the main firmware data.

9. The storage device of claim 8, wherein the main firmware executor is configured to provide a booting completion response to the host after completion of the rebooting operation by the main firmware data.

10. A storage device comprising:
a memory device including a firmware block group configured to store main firmware data of main firmware for performing an operation according to an operation request provided from a host, and sub firmware data of sub firmware for correcting an error of data related to a power loss;
a buffer memory configured to temporarily store data; and
a memory controller configured to control the memory device to load the sub firmware data to the buffer memory in response to a sub firmware execution request provided from the host, and execute the sub firmware according to the loaded sub firmware data.

11. The storage device of claim 10, wherein the memory device further includes a user block group that stores write data and a system block group that stores map data, the map data indicating a mapping relationship between a logical address and a physical address of the write data, and
the memory controller is configured to control the memory device to load the map data to the buffer memory when the sub firmware is executed, change an address exceeding a preset range among the logical address and the physical address, and control the memory device to store changed map data in the system block group.

12. The storage device of claim 10, wherein
the memory device further includes a user block group that stores write data and a system block group that stores writing pointer information and map data, the writing pointer information indicating a physical address of a page in which the write data is to be stored among a plurality of pages in an open block, and the map data indicating a physical address of an erase page in the open block, and
the memory controller is configured to control the memory device to load the writing pointer information and the map data to the buffer memory when the sub firmware is executed, change the writing pointer information according to whether the physical address of the page indicated by the writing pointer information corresponds to the physical address of the erase page indicated by the map data, and control the memory device to store the changed writing pointer information in the system block group.

13. The storage device of claim 10, wherein the memory controller is configured to control the memory device to load the main firmware data to the buffer memory when the execution of the sub firmware is completed.

14. The storage device of claim 13, wherein the memory controller is configured to
perform a rebooting operation using loaded main firmware data when the main firmware data is loaded to the buffer memory, and
provide a booting completion response indicating that the rebooting operation is completed to the host.

15. A computing system comprising:
a host device configured to output a booting request, determine whether a booting completion response to the booting request is received during a preset event period after the booting request is output, and output a sub firmware execution request according to a reception result of the booting completion response; and
a storage device configured to execute sub firmware for correcting an error of data related to a power loss, in response to the sub firmware execution request.

16. The computing system of claim 15, wherein the host device is configured to count a stuck count when the booting completion response is not received from the storage device during a preset response waiting time, and provide the sub firmware execution request to the storage device when the stuck count is greater than a reference count, the stuck count indicating a number of times the storage device does not respond.

17. The computing system of claim 16, wherein the host device is configured to provide a reset request requesting resetting to the storage device, and determine whether the booting completion response is received after the reset request is provided to the storage device.

18. The computing system of claim 15, wherein the host device is configured to
provide a booting request to the storage device,
provide a reset request requesting resetting to the storage device when the booting completion response is not received from the storage device during a preset response waiting time,
measure a stuck period corresponding to a period in which the storage device does not respond after the reset request is provided, and
provide the sub firmware execution request to the storage device when the stuck period is greater than a preset reference period.

19. The computing system of claim 15, wherein the storage device is configured to perform a rebooting operation using main firmware when the execution of the sub firmware is completed, and provide the booting completion response to the host device when the rebooting operation is completed.

20. The computing system of claim 15, wherein the host device is configured to provide a write request, a read request, or an erase request to the storage device after receiving the booting completion response.

* * * * *